(12) United States Patent
Inagaki et al.

(10) Patent No.: US 8,039,151 B2
(45) Date of Patent: Oct. 18, 2011

(54) NEGATIVE ELECTRODE ACTIVE MATERIAL, NONAQUEOUS ELECTROLYTE BATTERY, BATTERY PACK AND VEHICLE

(75) Inventors: Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1270 days.

(21) Appl. No.: 11/257,040

(22) Filed: Oct. 25, 2005

(65) Prior Publication Data

US 2007/0009798 A1 Jan. 11, 2007

(30) Foreign Application Priority Data

Jul. 7, 2005 (JP) .................................. 2005-199457

(51) Int. Cl.
*H01M 4/13* (2010.01)
*H01M 4/58* (2010.01)

(52) U.S. Cl. ................. 429/231.95; 429/209; 429/231.5

(58) Field of Classification Search .................... 429/13, 429/231.5; 42/231.5
See application file for complete search history.

(56) References Cited

U.S. PATENT DOCUMENTS

| | | | |
|---|---|---|---|
| 5,705,296 A * | 1/1998 | Kamauchi et al. | 429/330 |
| 5,888,670 A * | 3/1999 | Kawakami | 429/231.4 |
| 6,893,776 B2 * | 5/2005 | Naruoka et al. | 429/231.3 |
| 2001/0041290 A1* | 11/2001 | Morigaki et al. | 429/212 |
| 2002/0182480 A1* | 12/2002 | Hanauer et al. | 429/62 |
| 2004/0131934 A1* | 7/2004 | Sugnaux et al. | 429/209 |
| 2005/0064282 A1 | 3/2005 | Inagaki et al. | |
| 2005/0069777 A1 | 3/2005 | Takami et al. | |
| 2005/0221173 A1 | 10/2005 | Tatebayashi et al. | |
| 2005/0221187 A1 | 10/2005 | Inagaki et al. | |
| 2005/0221188 A1 | 10/2005 | Takami et al. | |
| 2006/0134520 A1 | 6/2006 | Ishii et al. | |
| 2006/0216600 A1* | 9/2006 | Inagaki et al. | 429/231.1 |
| 2006/0257746 A1* | 11/2006 | Inagaki et al. | 429/231.5 |
| 2008/0070115 A1 | 3/2008 | Saruwatari et al. | |

FOREIGN PATENT DOCUMENTS

| | | |
|---|---|---|
| CN | 1356737 A | 7/2002 |
| JP | 9-199179 | 7/1997 |
| JP | 9-309727 | 12/1997 |
| JP | 09-309728 | 12/1997 |
| JP | 9-309728 | 12/1997 |
| JP | 09309727 | * 12/1997 |
| JP | 09309728 | * 12/1997 |
| JP | 2000-156229 | 6/2000 |
| JP | 2002-289194 | 10/2002 |
| JP | 2004-214054 | 7/2004 |
| JP | 2004214054 | * 7/2004 |
| JP | 2004-311166 | 11/2004 |
| JP | 2005-123183 | 5/2005 |
| JP | 2005-135872 | 5/2005 |

(Continued)

OTHER PUBLICATIONS

U.S. Appl. No. 11/470,482, filed Sep. 6, 2006, Takami, et al.

(Continued)

*Primary Examiner* — Ula C. Ruddock
*Assistant Examiner* — Patricia Davis
(74) *Attorney, Agent, or Firm* — Oblon, Spivak, McClelland, Maier & Neustadt, L.L.P.

(57) ABSTRACT

A negative electrode active material includes lithium-titanium composite oxide porous particles having an average pore size of 50 to 500 Å.

20 Claims, 8 Drawing Sheets

FOREIGN PATENT DOCUMENTS

| | | | |
|---|---|---|---|
| JP | 2005123183 | * | 5/2005 |
| JP | 2005-142047 | | 6/2005 |
| WO | WO 99/04442 | | 1/1999 |
| WO | WO 03/076338 A1 | | 9/2003 |

OTHER PUBLICATIONS

U.S. Appl. No. 11/531,142, filed Sep. 12, 2006, Morishima, et al.
U.S. Appl. No. 12/047,708, filed Mar. 13, 2008, Saruwatari, et al.
U.S. Appl. No. 11/940,688, filed Nov. 15, 2007, Inagaki, et al.
U.S. Appl. No. 11/687,844, filed Mar. 19, 2007, Fujita, et al.
U.S. Appl. No. 11/687,860, filed Mar. 19, 2007, Fujita, et al.
U.S. Appl. No. 11/694,454, filed Mar. 30, 2007, Inagaki, et al.
U.S. Appl. No. 11/387,776, filed Mar. 24, 2006, Inagaki, et al.
U.S. Appl. No. 11/756,259, filed May 31, 2007, Saruwatari, et al.
U.S. Appl. No. 11/230,635, filed Sep. 21, 2005, Takami, et al.
U.S. Appl. No. 11/148,169, filed Jun. 9, 2005, Inagaki, et al.
U.S. Appl. No. 11/260,410, filed Oct. 28, 2005, Inagaki, et al.
U.S. Appl. No. 11/228,430, filed Sep. 19, 2005, Inagaki, et al.
U.S. Appl. No. 11/260,435, filed Oct. 28, 2005, Takami, et al.
U.S. Appl. No. 11/230,482, filed Sep. 21, 2005, Takami, et al.
U.S. Appl. No. 11/261,538, filed Oct. 31, 2005, Inagaki, et al.
U.S. Appl. No. 12/366,914, filed Feb. 6, 2009, Inagaki, et al.
U.S. Appl. No. 12/338,167, filed Dec. 18, 2008, Saruwatari, et al.
U.S. Appl. No. 12/512,540, filed Jul. 30, 2009, Inagaki, et al.

\* cited by examiner

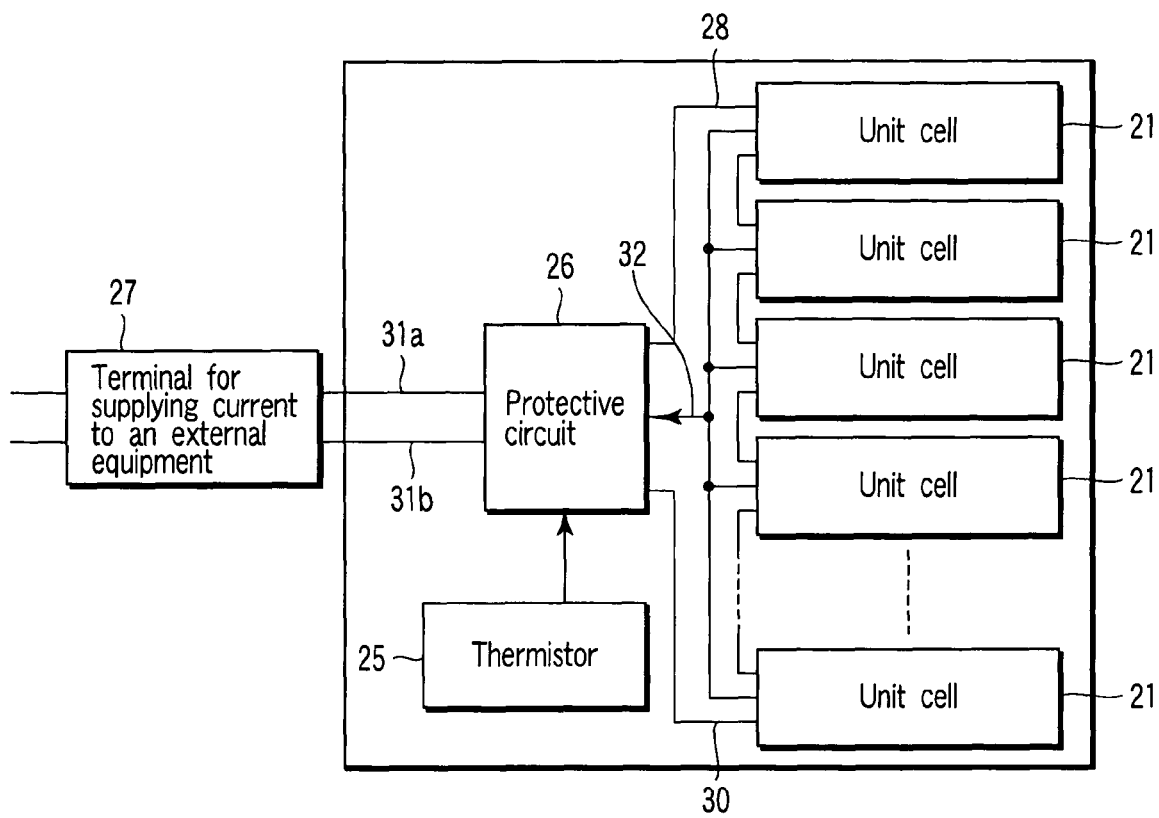
F I G. 6

NEGATIVE ELECTRODE ACTIVE MATERIAL, NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2005-199457, filed Jul. 7, 2005, the entire contents of which are incorporated herein by reference.

BACKGROUND OF THE INVENTION

1. Field of the Invention

The present invention relates to a negative electrode active material, a nonaqueous electrolyte battery using the negative electrode active material, a battery pack using the nonaqueous electrolyte battery, and a vehicle having the battery pack mounted thereto.

2. Description of the Related Art

Vigorous research is being conducted on a nonaqueous electrolyte battery in which the battery is charged and discharged by the migration of lithium ions between the negative electrode and the positive electrode in an attempt to develop a high energy density battery.

The nonaqueous electrolyte battery is required to satisfy various characteristics depending on the use of the battery. For example, it is desirable for the nonaqueous electrolyte battery used as a power source of a digital camera to achieve the discharge not lower than about 3 C, and for the nonaqueous electrolyte battery mounted to a vehicle such as a hybrid automobile to achieve the discharge not lower than about 10 C. Such being the situation, the nonaqueous electrolyte battery used in the fields exemplified above is required to exhibit an excellent charge-discharge cycle life when the charge-discharge is repeated under a large current.

The nonaqueous electrolyte battery available on the market nowadays comprises a positive electrode in which a lithium-transition metal composite oxide is used as the positive electrode active material and a negative electrode in which a carbonaceous material is used as the negative electrode active material. In general, Co, Mn, Ni, etc. are used as the transition metals contained in the lithium-transition metal composite oxide used as the positive electrode active material.

In recent years, a nonaqueous electrolyte battery in which lithium-titanium oxide having a high Li ion insertion potential, compared with the carbonaceous material, is used as a negative electrode active material has been put to the practical use. The lithium-titanium oxide is small in change of volume accompanying the charge-discharge operation of the secondary battery, and, thus, permits the nonaqueous electrolyte battery using the lithium-titanium oxide as the negative electrode active material to be excellent in the charge-discharge cycle characteristics, compared with the nonaqueous electrolyte battery using the carbonaceous material as the negative electrode active material. Particularly, it is desirable to use lithium titanate having a spinel structure as the negative electrode active material.

For example, Japanese Patent Disclosure (Kokai) No. 09-199179 discloses a nonaqueous electrolyte battery comprising lithium titanate, which is small in change of volume during the charge-discharge operation of the secondary battery, as the negative electrode active material. It is taught that the nonaqueous electrolyte battery is small in change of volume, and that the short circuiting and the decrease of the battery capacity accompanying the swelling of the electrode are unlikely to take place.

On the other hand, Japanese Patent Disclosure No. 09-309727 refers to secondary particles of lithium titanate having a laminate structure constructed such that a plurality of plate-like or flake-like lithium titanate primary particles are superposed one upon the other. It is taught that pores, each sized about 4 nm (40 Å), are formed among the primary particles to increase the specific surface area of the secondary particles of lithium titanate.

BRIEF SUMMARY OF THE INVENTION

An object of the present invention is to provide a negative electrode active material excellent in the large current characteristics and in the charge-discharge cycle characteristics, a nonaqueous electrolyte battery using the negative electrode active material, a battery pack using the nonaqueous electrolyte battery, and a vehicle using the battery pack.

According to a first aspect of the present invention, there is provided a nonaqueous electrolyte battery, comprising:

a positive electrode;

a negative electrode containing lithium-titanium composite oxide porous particles having an average pore size of 50 to 500 Å; and a nonaqueous electrolyte.

According to a second aspect of the present invention, there is provided a battery pack, comprising nonaqueous electrolyte batteries, each comprising:

a positive electrode;

a negative electrode containing lithium-titanium composite oxide porous particles having an average pore size of 50 to 500 Å; and a nonaqueous electrolyte.

According to a third aspect of the present invention, there is provided a negative electrode active material comprising lithium-titanium composite oxide porous particles having an average pore size of 50 to 500 Å.

Further, according to a fourth aspect of the present invention, there is provided a vehicle comprising a battery pack including nonaqueous electrolyte batteries, each comprising:

a positive electrode;

a negative electrode containing lithium-titanium composite oxide porous particles having an average pore size of 50 to 500 Å; and a nonaqueous electrolyte.

BRIEF DESCRIPTION OF THE SEVERAL VIEWS OF THE DRAWING

FIG. 6 is a block diagram showing the electric circuit of the battery pack shown in FIG. 5;

DETAILED DESCRIPTION OF THE INVENTION

Figure 1:
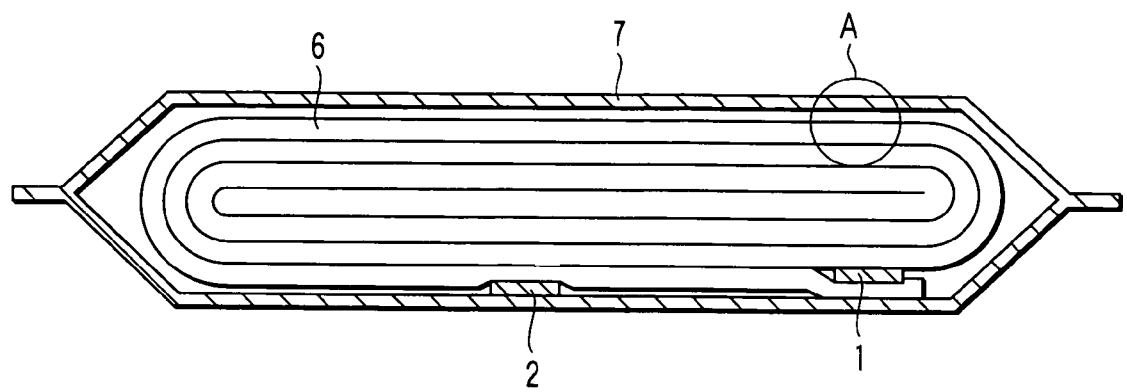
FIG. 1 is a cross sectional view schematically showing the construction of a flat type nonaqueous electrolyte battery according to a first embodiment of the present invention.

A lithium-titanium composite oxide is small in change of volume accompanying the charge-discharge operation of the battery, i.e., accompanying the absorption-release of lithium ions. The electrode containing the composite oxide as the active material is unlikely to be swollen. On the other hand, the volume of the negative electrode available on the market, which contains a carbonaceous material such as graphite as the negative electrode active material, is expanded or shrunk by several percent in accordance with the charge-discharge operation of the battery. As a result, where, for example, graphite is used as the negative electrode active material, the nonaqueous electrolyte is diffused in accordance with the expansion and shrinkage of the electrode. As a result, the impregnation of the negative electrode with the nonaqueous electrolyte tends to be made uniform. Alternatively, the concentration of the lithium salt tends to be made uniform. It has been found, however, that the electrode containing a lithium-titanium composite oxide and, thus, small in change of volume, is markedly poor in the impregnation capability with the nonaqueous electrolyte. Particularly, in the case of manufacturing a large battery mounted to, for example, a vehicle, the poor impregnation capability of the electrode with the nonaqueous electrolyte lowers not only the productivity but also the battery performance, in particular, the large current performance and the charge-discharge cycle characteristics.

Under the circumstances, the present inventors have strongly pulverized the lithium-titanium composite oxide powder containing the lithium-titanium oxide having a spinel structure as the main phase, followed by baking again the pulverized material under an appropriate heat treating condition to succeed in the synthesis of lithium-titanium composite oxide porous particles having an average pore size of 50 to 500 Å. It has been found that, by synthesizing the lithium-titanium composite oxide porous particles having an average pore size of 50 to 500 Å, it is possible to markedly improve the impregnation capability of the negative electrode with the nonaqueous electrolyte to improve not only the productivity but also the large current characteristics and the charge-discharge cycle life of the battery. Incidentally, the impregnation capability of the negative electrode with the nonaqueous electrolyte can be further improved, if the specific pore volume of the lithium-titanium composite oxide porous particles is not smaller than 0.01 mL/g.

It should also be noted that, if the specific volume of pores having a size not larger than 10 Å, i.e., so-called micro pores, is not smaller than 0.001 mL/g in the lithium-titanium composite oxide porous particles having the average pore size noted above, it is possible to permit the lithium ions to be migrated to reach the region that was not involved in the reaction in the past. As a result, it is possible to realize the lithium absorption capability close to the theoretical capacity of the lithium-titanium oxide to increase the energy density of the battery.

Some embodiments of the present invention will now be described with reference to the accompanying drawings. Incidentally, the common constituents of the invention are denoted by the same reference numerals in the accompanying drawings to omit the overlapping description. Also, the accompanying drawings are schematic drawings that are simply intended to facilitate the description and understanding of the invention. It is possible for the shape, the size, the ratio, etc. shown in the drawing to differ from those of the actual battery. Of course, the design relating to the size, shape, etc. can be changed appropriately in view of the description given below and the known technology.

First Embodiment

An example of the construction of the unit cell, i.e., non-aqueous electrolyte battery, according to the first embodiment of the present invention will now be described with reference to FIGS. 1 and 2. Specifically, FIG. 1 is a cross sectional view schematically showing the construction of a flat type nonaqueous electrolyte battery according to a first embodiment of the present invention, and FIG. 2 is a cross sectional view schematically showing in detail in a magnified fashion the construction of the circular region A of the non-aqueous electrolyte battery shown in FIG. 1.

As shown in FIG. 1, a flat type wound electrode group 6 is housed in a case 7. The wound electrode group 6 is formed of a laminate structure comprising a positive electrode 3, a negative electrode 4, and a separator 5 interposed between the positive electrode 3 and the negative electrode 4. The electrode group 6 is obtained by spirally winding the laminate structure noted above. Further, a nonaqueous electrolyte is retained by the wound electrode group 6.

Figure 2:
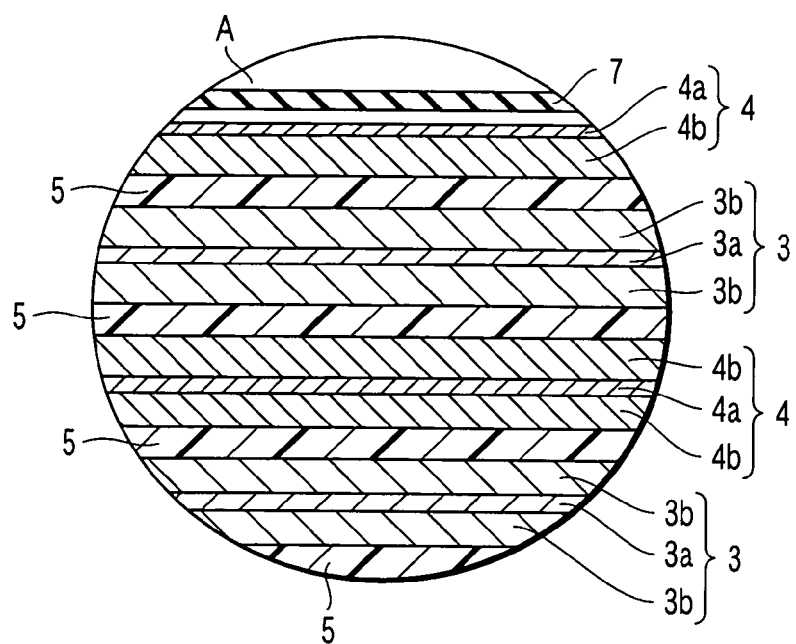
FIG. 2 is a cross sectional view showing in detail in a magnified fashion the construction of the circular region A of the nonaqueous electrolyte battery shown in FIG. 1.

As shown in FIG. 2, the negative electrode 4 is positioned to constitute the outermost circumferential region of the wound electrode group 6. Also, the positive electrode 3 and the negative electrode 4 are alternately laminated one upon the other with the separator 5 interposed therebetween. For example, the separator 5, the positive electrode 3, the separator 5, the negative electrode 4, the separator 5, the positive electrode 3 and the separator 5 are laminated one upon the other in the order mentioned. The negative electrode 4 comprises a negative electrode current collector 4a and a negative electrode active material-containing layer 4b supported by the negative electrode current collector 4a. In that region of the negative electrode 4 which constitutes the outermost circumferential region, the negative electrode active material-containing layer 4b is formed on one surface of the negative electrode current collector 4a. On the other hand, the positive electrode 3 comprises a positive electrode current collector 3a and a positive electrode active material-containing layer 3b supported by the positive electrode current collector 3a.

As shown in FIG. 1, a band-like positive electrode terminal 1 is electrically connected to the positive electrode current collector 3a in the vicinity of the outer circumferential region of the wound electrode group 6. On the other hand, a band-like negative electrode terminal 2 is electrically connected to the negative electrode current collector 4a in the vicinity of the outer circumferential region of the wound electrode group 6. Further, the tip portions of the positive electrode terminal 1 and the negative electrode terminal 2 are withdrawn to the outside of the case 7 via the same side of the case 7.

The negative electrode, the nonaqueous electrolyte, the positive electrode, the separator, the case, the positive electrode terminal and the negative electrode terminal will now be described in detail.

1) Negative Electrode

The negative electrode comprises a negative electrode current collector and a negative electrode layer supported on one surface or both surfaces of the negative electrode current collector and containing a negative electrode active material, a negative electrode conductive agent and a binder.

The negative electrode active material includes porous particles of lithium-titanium composite oxide which have an average pore size not smaller than 50 Å. It is desirable for the pore to be an open cell formed inside a porous material and extending to reach the surface of the porous material, as defined in "Iwanami's Dictionary of Physics and Chemistry 5th Edition CD-ROM". Also, it is desirable for the lithium-titanium composite oxide to contain any of the lithium-titanium oxide phase and a lithium/titanium-containing oxide phase obtained by selectively substituting a foreign element for the constituting elements of the lithium-titanium oxide. In order to obtain excellent large current characteristics and excellent charge-discharge cycle characteristics, it is desirable for the lithium-titanium composite oxide to contain the lithium-titanium oxide phase as the main phase. The term "main phase" noted above denotes the phase having the highest presence ratio among the lithium-titanium composite oxide.

The presence ratio of the constituting phase can be confirmed by the method described in the following.

Specifically, an X-ray diffraction measurement is applied to the porous particles of lithium-titanium composite oxide, and the constituting phase of the lithium-titanium composite oxide is identified from the resultant X-ray diffraction pattern. It is possible to specify the main phase of the lithium-titanium composite oxide by comparing the intensity ratios of the main peaks of the identified constituting phases.

For example, it is possible for the lithium-titanium composite oxide having the spinel structure and the composition of $Li_{4+x}Ti_5O_{12}$ ($0 \leq x \leq 3$) to contain the anatase type $TiO_2$, the rutile type $TiO_2$ and $Li_2TiO_3$, etc. as impurity phases. If the X-ray diffractometry measurement using Cu—Kα is applied to the lithium-titanium composite oxide noted above, the main peak of $Li_{4+x}Ti_5O_{12}$ ($0 \leq x \leq 3$) appears at 4.83 Å (2θ: 18°), and the main peaks of anatase type $TiO_2$, rutile type $TiO_2$ and $Li_2TiO_3$ appear at 3.51 Å (2θ: 25°), 3.25 Å (2θ: 27°) and 2.07 Å (2θ: 43°), respectively. It is possible to specify the main phase by comparing these intensities.

Incidentally, where the lithium-titanium composite oxide having the spinel structure, which forms the main phase, it is desirable for the main peak intensity of each of the rutile type $TiO_2$, the anatase type $TiO_2$ and $Li_2TiO_3$ to be not higher than 7, more desirably not higher than 3, on the basis that the main peak intensity of lithium titanate having the spinel structure as determined by the X-ray diffractometry is set at 100. It should be noted that the diffusion rate of the lithium ions is improved and the ionic conductivity and the large current characteristics are improved with decrease in the amount of these impurity phases.

The lithium-titanium oxide includes, for example, the lithium-titanium oxide having the spinel structure, e.g., $Li_{4+x}Ti_5O_{12}$ ($0 \leq x \leq 3$), and the lithium-titanium oxide having the ramsdellite structure, e.g., $Li_{2+y}Ti_3O_7$ ($0 \leq y \leq 3$). It is desirable to use the lithium-titanium oxide having the spinel structure because it is possible to obtain excellent charge-discharge cycle characteristics of the battery.

It is acceptable for the lithium-titanium composite oxide to contain constituting phases other than the lithium-titanium oxide phase and the lithium/titanium-containing oxide phase. For example, it is possible for the lithium-titanium composite oxide to contain the $TiO_2$ phase and the $Li_2TiO_3$ phase.

The average pore size of the lithium-titanium composite oxide porous particles falls within a range of 50 to 500 Å as described previously. Where the average pore size falls within the range noted above, it is possible to improve the wettability of the nonaqueous electrolyte with the surface of the lithium-titanium composite oxide porous particles to improve the impregnation capability of the negative electrode with the nonaqueous electrolyte and, thus, to improve the charge-discharge cycle characteristics of the battery. It should be noted that the reaction of the negative electrode with the nonaqueous electrolyte causes a by-product (organic or inorganic material) to be deposited on the surface of the lithium-titanium composite oxide porous particles, though the deposition amount is small. If the average pore size of the lithium-titanium composite oxide porous particles is smaller than 50 Å, the pores are closed in accordance with growth of the by-product, with the result that the liquid retaining capability, i.e., the capability of retaining the nonaqueous electrolyte, of the negative electrode is lowered to lower the large current characteristics. Such being the situation, it is desirable for the average pore size of the lithium-titanium composite oxide porous particles to be not smaller than 50 Å, more desirably not smaller than 100 Å. On the other hand, if the pore size is large, the strength of the powdery material is lowered, with the result that it is possible for the lithium-titanium composite oxide porous particles, which is a powdery material, to be collapsed when the density of the electrode is increased. Under the circumstances, it is desirable for the upper limit of the average pore size of the lithium-titanium composite oxide porous particles to be set at 500 Å in order to increase the density of the electrode, i.e., in order to increase the volume energy density of the electrode.

It is desirable for the pores formed in the lithium-titanium composite oxide porous particles to have micro pores having a pore size not larger than 10 Å. If the lithium-titanium composite oxide porous particles have the micro pores, the wettability of the negative electrode with the nonaqueous electrolyte is improved to increase the impregnation capability of the negative electrode with the nonaqueous electrolyte. It is also possible to decrease that region of the lithium-titanium composite oxide porous particles which does not contribute to the charge-discharge reaction to improve the charge-discharge capacity of the battery. In order to obtain a sufficient effect produced by the presence of the micro pores, it is desirable for the specific volume of the pores having a pore size not larger than 10 Å to be not smaller than 0.001 mL/g. The upper limit of the specific volume of the pores is not particularly specified. However, it is desirable for the upper limit of the specific volume of the pores to be set at 0.01 mL/g in view of the volume energy density of the negative electrode. It is more desirable for the specific volume of the pores to fall within a range of 0.0015 to 0.003 mL/g.

If the specific pore volume of the lithium-titanium composite oxide porous particles is not smaller than 0.01 mL/g, the negative electrode is impregnated smoothly with the nonaqueous electrolyte to improve the wettability of the lithium-titanium composite oxide porous particles with the nonaqueous electrolyte, with the result that the reaction of the lithium-titanium composite oxide proceeds smoothly when the battery is charged and discharged. It follows that an overvoltage is not applied locally to improve the charge-discharge cycle life of the battery. It should also be noted that the negative electrode exhibits an improved capability of retaining the nonaqueous electrolyte, with the result that the depletion of the nonaqueous electrolyte is unlikely to take place to further improve the charge-discharge cycle life of the battery. It is more desirable for the specific pore volume of the lithium-titanium composite oxide porous particles to be not smaller than 0.02 mL/g, furthermore desirably to be not smaller than 0.1 mL/g. The upper limit of the specific pore volume noted above is not particularly specified. However, it is desirable for the specific pore volume to be not larger than 1 mL/g in view of the volume energy density of the negative electrode.

It is desirable for the lithium-titanium composite oxide porous particles to have an average particle diameter not larger than 1 μm. If the average particle diameter exceeds 1 μm, it is difficult to expect the sufficient impregnation capability of the negative electrode with the nonaqueous electrolyte even if the average pore size is set to fall within the range specified in the first embodiment. It should be noted, however, that, if the average particle diameter of the lithium-titanium composite oxide porous particles is excessively small, the distribution of the nonaqueous electrolyte is inclined on the negative electrode to bring about possibly the depletion of the nonaqueous electrolyte on the positive electrode. Such being the situation, it is desirable for the lower limit in the average particle diameter of the lithium-titanium composite oxide porous particles to be set at 0.001 μm. It is more desirable for the lithium-titanium composite oxide porous particles to have an average particle diameter not larger than 1 μm and to have a BET specific surface area as determined by the $N_2$ adsorption falling within a range of 5 to 50 $m^2/g$.

A method of manufacturing the lithium-titanium composite oxide porous particles will now be exemplified.

In the first step, a lithium salt such as lithium hydroxide, lithium oxide or lithium carbonate is prepared as the lithium source. Then, a prescribed amount of the lithium salt is dissolved in a pure water, followed by adding titanium oxide to the resultant solution such that lithium and titanium have a prescribed atomic ratio. In the case of synthesizing the lithium-titanium oxide having the composition of $Li_4Ti_5O_{12}$ and the spinel structure, Li and Ti are mixed in a manner to have an atomic ratio of 4:5.

In the next step, the mixture is dried while stirring the resultant solution to obtain a baking precursor. The drying method employed in this stage includes, for example, a spray drying method, a granulating drying method, a freeze drying method, and a combination thereof. The baking precursor thus obtained is baked to obtain a lithium-titanium composite oxide. It suffices to carry out the baking under the air atmosphere. It is also possible to carry out the baking under an oxygen gas atmosphere or an inert gas atmosphere such as an argon gas atmosphere.

It suffices to carry out the baking at 680 to 1,000° C. for 1 to 24 hours. Preferably, the baking should be carried out at 720 to 800° C. for 5 to 10 hours.

If the baking temperature is lower than 680° C., the reaction between titanium oxide and the lithium compound is not carried out sufficiently to increase the impurity phases such as the anatase type $TiO_2$, the rutile type $TiO_2$ and $Li_2TiO_3$, with the result that the electric capacity of the negative electrode is lowered. On the other hand, if the baking temperature exceeds 1,000° C., the crystallite diameter is rendered excessively large in accordance with progress of the baking in the case of the lithium titanate having the spinel structure to lower the large current performance.

It is possible to control the pore volume and the average pore size of the primary particles by pulverizing and re-baking the lithium-titanium composite oxide porous particles obtained by the baking treatment described above. The pulverizing treatment and the re-baking treatment noted above are carried out under the conditions described in the following. In the pulverizing method, it is possible to use, for example, a mortar, a ball mill, a sand mill, a vibrating ball mill, a planetary ball mill, a jet mill, a counter jet mill, a whirling air stream type jet mill or a sieve. In the pulverizing stage, it is possible to employ a wet pulverization that is carried out in the presence of a known liquid pulverizing aid such as water, ethanol, ethylene glycol, benzene or hexane. It is effective to use the pulverizing aid for improving the pulverizing efficiency and for increasing the formed amount of the fine powdery material. It is more desirable to use a ball mill utilizing zirconia balls as the pulverizing medium to carry out the wet pulverization with the liquid pulverizing aid added thereto. Further, in order to improve the pulverizing efficiency, it is possible to add an organic material such as polyol as a pulverizing aid. The polyol used as the pulverizing aid is not particularly limited. However, it is possible to use pentaerythritol, triethylol ethane, and trimethylol propane singly or in combination.

It also suffices to carry out the re-baking under the air atmosphere. It is also possible to carry out the re-baking under an oxygen atmosphere or an inert gas atmosphere such as an argon gas atmosphere. It suffices to carry out the re-baking at 250 to 900° C. for about one minute to 10 hours. If the re-baking temperature is higher than 900° C., the re-baking of the pulverized powder proceeds excessively to collapse the pores even if the heat treatment is carried out for a short time, resulting in failure to obtain the pore size distribution specified in the first embodiment of the present invention. On the other hand, if the re-baking temperature is lower than 250° C., it is impossible to remove the impurities (organic material) attached to the pulverized powder in the wet pulverizing stage to lower the battery performance. It is more desirable for the re-baking to be carried out at 400 to 700° C. for 10 minutes to 3 hours.

It is desirable for the pH value of the lithium-titanium composite oxide porous particles having an average pore size of 50 to 500 Å to fall within a range of 10 to 11.2. In the baking process of the lithium-titanium composite oxide such as lithium titanate, lithium carbonate or lithium hydroxide is formed as a by-product, which is derived from the unreacted Li component that is not taken into the lithium titanate. It is possible to improve the battery performance, particularly, the high temperature charge-discharge cycle performance and the output performance, by decreasing the amount of the unreacted Li component to 11.2 or less in terms of the pH value.

It should be noted that the unreacted Li component such as lithium carbonate or lithium hydroxide remaining on the surface of the active material reacts with the nonaqueous electrolyte to generate a carbon dioxide gas or a hydrocarbon gas. Also, an organic film acting as a resistance component is formed on the surface of the active material by the side reaction noted above.

However, where the lithium titanate powder is mechanically pulverized under the conditions given previously, the unreacted Li component tends to be exposed to the surface to cause the pH value to be increased to exceed 11.2, thereby lowering the battery performance. Such being the situation, the re-baking process is carried out after the pulverizing process. By the re-baking process, the unreacted Li component exposed to the surface is taken into the inner region of the active material to decrease the unreacted Li component remaining on the surface. Such being the situation, the pH value can be controlled to 11.2 or less by applying the rebaking process after the pulverizing process.

It is possible to decrease the amount of the excessive Li such as lithium carbonate formed as a by-product by lowering the ratio of the Li source in the stage of carrying out the reaction between the Li source such as lithium hydroxide or lithium carbonate, which is used as the raw material of lithium titanate, and titanium oxide, e.g., anatase type $TiO_2$ or rutile type $TiO_2$. However, if the ratio of the Li source is lowered, the ratio of lithium contained in the obtained active material is lowered, with the result that the electric capacity of lithium titanate is lowered. Such being the situation, in order to maintain a high electric capacity, it is desirable for the pH value of the resultant active material to be maintained at 10 or more without decreasing the amount of the Li source.

Also, it is more desirable for the pH value to fall within a range of 10.3 to 11 in order to maintain the high electric capacity and in view of the aspect of suppressing the side reaction.

Incidentally, the pH value of the lithium-titanium composite oxide porous particles can be measured as follows. Specifically, 2 g of the lithium-titanium composite oxide porous particles used as the negative electrode active material are dispersed in 100 mL of a pure water (25° C.), and the suspension is stirred for about 10 minutes, followed by filtering the active material to obtain a filtrate. The pH value of the filtrate is used as the pH value of the lithium-titanium composite oxide porous particles.

It is desirable for the negative electrode current collector to be formed of an aluminum foil or an aluminum alloy foil. In the case of using an aluminum foil or an aluminum alloy foil as the negative electrode current collector, it is possible to prevent the negative electrode current collector from being dissolved in and corroded by the nonaqueous electrolyte during the over-discharge cycle.

It is desirable for the negative electrode current collector to have an average crystal grain size not larger than 50 μm. In this case, the mechanical strength of the current collector can be drastically increased to make it possible to increase the density of the negative electrode by applying the pressing under a high pressure to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain size of the negative electrode current collector to be not larger than 30 μm, furthermore desirably, not larger than 5 μm.

The average crystal grain size can be obtained as follows. Specifically, the texture of the current collector surface is observed with an electron microscope to obtain the number n of crystal grains present within an area of 1 mm×1 mm. Then, the average crystal grain area S is obtained from the formula "$S=1\times10^6/n$ (μm$^2$)", where n denotes the number of crystal grains noted above. Further, the average crystal grain size d (μm) is calculated from the area S by formula (I) given below:

$$d=2(S/\pi)^{1/2} \tag{I}$$

The aluminum foil or the aluminum alloy foil having the average crystal grain size not larger than 50 μm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, more desirably not larger than 15 μm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

It is possible for the negative electrode active material-containing layer to contain a conductive agent. The conductive agent includes, for example, a carbon material, a metal powder such as an aluminum powder, and a conductive ceramic material such as TiO. The carbon material used as the conductive agent includes, for example, acetylene black, carbon black, coke, a carbon fiber and graphite. It is more desirable for the carbon material to include, for example, coke subjected to a heat treatment at 800 to 2,000° C. and having an average particle diameter not larger than 10 μm, graphite, a TiO powder, and a carbon fiber having an average particle diameter not larger than 1 μm. It is desirable for the carbon material to have at least 10 m$^2$/g of the BET specific surface area as determined by the $N_2$ adsorption.

It is also possible for the negative electrode active material-containing layer to contain a binder. The binder includes, for example, polytetrafluoroethylene (PTFE), polyvinylidene fluoride (PVdF), a fluorinated rubber, styrene-butadiene rubber and a core shell binder.

Concerning the mixing ratio of the negative electrode active material, the negative electrode conductive agent, and the binder, it is desirable for the negative electrode active material to be used in an amount not smaller than 70% by weight and not larger than 96% by weight, for the negative electrode conductive agent to be used in an amount not smaller than 2% by weight and not larger than 28% by weight, and for the binder to be used in an amount not smaller than 2% by weight and not larger than 28% by weight. If the mixing amount of the negative electrode conductive agent is smaller than 2% by weight, the current collecting performance of the negative electrode layer may be lowered so as to possibly lower the large current characteristics of the nonaqueous electrolyte battery. Also, if the mixing amount of the binder is smaller than 2% by weight, the bonding between the negative electrode layer and negative electrode current collector may be lowered so as to possibly lower the charge-discharge cycle characteristics of the nonaqueous electrolyte battery. On the other hand, it is desirable for the mixing amount of each of the negative electrode conductive agent and the binder to be not larger than 28% by weight in view of the improvement in the capacity of the nonaqueous electrolyte battery.

The negative electrode can be manufactured by suspending the negative electrode active material, the conductive agent and the binder described above in a suitable solvent, followed by coating the current collector with the resultant suspension and subsequently drying, pressing the current collector coated with the suspension.

In the case of evaluating the properties of the negative electrode active material such as the pore size distribution and the particle diameter by taking the negative electrode active material out of the nonaqueous electrolyte battery, the negative electrode is taken out by dismantling the nonaqueous electrolyte battery under an argon gas atmosphere, followed by peeling off the negative electrode active material-containing layer from the negative electrode current collector. If the negative electrode active material-containing layer is dispersed in acetone, the conductive agent and the binder attached to the negative electrode active material is dissolved in acetone to make it possible to extract the negative electrode active material. After it has been confirmed by, for example, the X-ray diffraction that the conductive agent and the binder have been removed from the negative electrode active material, the required evaluation of the characteristics is carried out.

2) Nonaqueous Electrolyte

The nonaqueous electrolyte includes a liquid nonaqueous electrolyte that is prepared by dissolving an electrolyte in an organic solvent and a gel-like nonaqueous electrolyte that is prepared by using a composite material containing a liquid nonaqueous electrolyte and a polymer material.

Also, it is possible to permit the nonaqueous electrolyte to contain a room temperature molten salt formed of a non-combustible ionic liquid that is not volatile.

The liquid nonaqueous electrolyte can be prepared by dissolving an electrolyte in an organic solvent in a concentration of 0.5 to 2.5 mol/L.

The electrolyte includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bis-trifluoromethyl sulfonyl imide lithium [$LiN(CF_3SO_2)_2$], and a mixture thereof.

The electrolyte containing $LiBF_4$ permits further improving the impregnation capability of the negative electrode active material with the nonaqueous electrolyte and, thus, it is desirable to use the electrolyte containing $LiBF_4$.

The organic solvent includes, for example, cyclic carbonates such as propylene carbonate (PC), ethylene carbonate (EC) and vinylene carbonate; linear carbonates such as diethyl carbonate (DEC), dimethyl carbonate (DMC) and methyl ethyl carbonate (MEC); cyclic ethers such as tetrahydrofuran (THF), 2-methyl tetrahydrofuran (2Me THF) and dioxolane (DOX); linear ethers such as dimethoxy ethane (DME), and diethoxy ethane (DEE); as well as γ-butyrolactone (GBL), acetonitrile (AN) and sulfolane (SL). These solvents can be used singly or in the form of a mixed solvent.

The polymer materials include, for example, polyvinylidene fluoride (PVdF), polyacrylonitrile (PAN) and polyethylene oxide (PEO).

It is desirable to use a mixed solvent prepared by mixing at least two organic solvents selected from the group consisting of propylene carbonate (PC), ethylene carbonate (EC) and γ-butyrolactone (GBL). It is more desirable to use γ-butyrolactone (GBL) as the organic solvent. The reasons why these organic compounds can be used as excellent solvents are as follows.

First of all, each of γ-butyrolactone, propylene carbonate and ethylene carbonate has a high boiling point and a high ignition point and is excellent in the thermal stability.

Secondly, the lithium-titanium oxide absorbs and releases the lithium ions within the potential region in the vicinity of 1.5V (vs. Li/Li$^+$). However, it is impossible to form sufficiently a film made of the reduction product of the nonaqueous electrolyte on the surface of the lithium-titanium oxide particle within the potential region noted above, though it is certainly possible to allow the nonaqueous electrolyte to be reduced and decomposed within the potential region noted above. Therefore, if the battery is stored under the charged state, the lithium ions absorbed in the lithium-titanium composite oxide is gradually diffused into the nonaqueous electrolyte to bring about a so-called "self-discharge". The self-discharge is generated prominently if the battery is stored under an environment of a high temperature.

If the pore size distribution of the negative electrode active material are controlled as described in the first embodiment of the present invention, the contact area between the negative electrode and the nonaqueous electrolyte is increased, with the result that the self-discharge noted above tends to be somewhat increased.

It should be noted that γ-butyrolactone tends to be reduced easily, compared with the linear carbonate and the cyclic carbonate. To be more specific, the solvents tend to be reduced in the order of γ-butyrolactone>>>ethylene carbonate>propylene carbonate>>dimethyl carbonate>methyl ethyl carbonate>diethyl carbonate in the order mentioned. Incidentally, the degree of difference in reactivity among the solvents is increased with increase in the number of signs of inequality ">" noted above.

Such being the situation, if γ-butyrolactone is contained in the nonaqueous electrolyte, a satisfactory film is formed on the surface of the negative electrode even under the operating potential region of the lithium-titanium composite oxide. As a result, the self-discharge of the battery is suppressed to improve the storage characteristics of the nonaqueous electrolyte battery under high temperatures.

This is also the case with the mixed solvent noted above.

Also, a similar effect can be obtained in the case of using the ionic liquid that can be reduced easily. It should also be noted that the ionic liquid also tends to be oxidized easily. Therefore, in the case of using the ionic liquid, the ionic liquid acts on the positive electrode to produce the effect of suppressing the self-discharge and the effect of improving the charge-discharge cycle life.

In order to form a more satisfactory protective film, it is desirable for the mixture of the organic solvents to contain 40 to 95% by volume of γ-butyrolactone.

The nonaqueous electrolyte containing γ-butyrolactone, which exhibits excellent effects as described above, has a high viscosity to lower the impregnation capability of the negative electrode with the nonaqueous electrolyte. However, in the case of using the negative electrode specified in the first embodiment of the present invention, the negative electrode is allowed to be impregnated smoothly with the nonaqueous electrolyte even if the nonaqueous electrolyte contains γ-butyrolactone to improve the productivity and to improve the output characteristics and the charge-discharge cycle characteristics of the battery. It is also possible to obtain a similar effect in the case of using the ionic liquid because of high viscosity. It follows that the negative electrode active material in the first embodiment of the present invention produces prominent effects in the case of using the nonaqueous electrolyte containing γ-butyrolactone or an ionic liquid having a viscosity not lower than 5 cp at 20° C.

It is possible to set the upper limit of the viscosity of the nonaqueous electrolyte at 20° C. at 30 cp.

The nonaqueous electrolyte containing the ionic liquid will now be described.

The ionic liquid denotes a salt which partly exhibits a liquid state under the room temperature. The term "room temperature" denotes the temperature range within which the power source is assumed to be operated in general. The upper limit of the temperature range within which the power source is assumed to be operated in general is about 120° C., or about 60° C. in some cases, and the lower limit is about −40° C. or about −20° C. in some cases. It is desirable for the room temperature to fall within a range of −20° C. to 60° C.

The ionic liquid should desirably contain lithium ions, organic cations and organic anions. It is desirable for the ionic liquid to assume a liquid form even under the temperature not higher than room temperature.

The organic cation noted above includes, for example, quaternary ammonium ion and alkyl imidazolium ion having a skeleton represented by chemical formula (1) given below:

(1)

It is desirable to use dialkyl imidazolium ion, trialkyl imidazolium ion and tetraalkyl imidazolium ion as the alkyl imidazolium ion noted above. The dialkyl imidazolium ion includes, for example, 1-methyl-3-ethyl imidazolium ion (MEI$^+$). The trialkyl imidazolium ion includes, for example, 1,2-diethyl-3-propyl imidazolium ion (DMPI$^+$). And the tetraalkyl imidazolium ion includes 1,2-diethyl-3,4(5)-dimethyl imidazolium ion.

On the other hand, the quaternary ammonium ion includes tetraalkyl ammonium ion and cyclic ammonium ion. The tetraalkyl ammonium ion noted above includes dimethyl ethyl methoxy ammonium ion, dimethyl ethyl methoxy methyl ammonium ion, dimethyl ethyl ethoxy ethyl ammonium ion, and trimethyl propyl ammonium ion.

In the case of using the alkyl imidazolium ion or the quaternary ammonium ion (particularly, tetraalkyl ammonium ion) as the organic cation, it is possible to lower the melting point of the nonaqueous electrolyte to 100° C. or less, more desirably to 20° C. or less. Further, it is possible to suppress the reactivity of the nonaqueous electrolyte with the negative electrode.

It is desirable for the lithium ion concentration to be not higher than 20 mol %, more desirably to fall within a range of 1 to 10 mol %. Where the lithium ion concentration falls within the range given above, the ionic liquid can be formed easily even under the low temperature not higher than 20° C. It is also possible to lower the viscosity of the nonaqueous electrolyte even under the temperature not higher than the room temperature to increase the ionic conductivity.

The anion contained in the ionic liquid is selected from the group consisting of, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. It is desirable for the organic cation noted above to be present together with at least one anion selected from the group given above. Where a plurality of anions are present together, an ionic liquid having a melting point not higher than 20° C. can be formed easily. More desirably, it is possible to obtain an ionic liquid having a melting point not higher than 0° C. More desirable anions include, for example, $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. Where these anions are used, an ionic liquid having a melting point not higher than 0° C. can be formed easily.

3) Positive Electrode

The positive electrode includes a positive electrode current collector and a positive electrode active material-containing layer supported on one surface or both surfaces of the positive electrode current collector and containing a positive electrode active material, positive electrode conductive agent and a binder.

The positive electrode active material includes, for example, an oxide, a sulfide and a polymer.

The oxides include, for example, manganese dioxide ($MnO_2$) absorbing Li, iron oxide, copper oxide, nickel oxide, a lithium-manganese composite oxide (e.g., $Li_xMn_2O_4$ or $Li_xMnO_2$), a lithium-nickel composite oxide, e.g., $Li_xNiO_2$, a lithium-cobalt composite oxide (e.g., $Li_xCoO_2$), a lithium-nickel-cobalt composite oxide, e.g., $LiNi_{1-y}Co_yO_2$, a lithium-manganese-cobalt composite oxide (e.g., $LiMn_yCo_{1-y}O_2$), a spinel type lithium-manganese-nickel composite oxide (e.g., $Li_xMn_{2-y}Ni_yO_4$), a lithium phosphorus oxide having an olivine structure (e.g., $Li_xFePO_4$, $Li_xFe_{1-x}Mn_yPO_4$, $Li_xVPO_4F$, and $Li_xCoPO_4$ (0≦x≦1, 0≦y≦1), iron sulfate ($Fe_2(SO_4)_3$), vanadium oxide (e.g., $V_2O_5$), and a lithium-nickel-cobalt-manganese composite oxide.

The polymer includes, for example, a conductive polymer material such as polyaniline or polypyrrole, and a disulfide based polymer material. It is also possible to use sulfur (S) and a fluorocarbon as the positive electrode active material.

The positive electrode active material that permits obtaining a high positive electrode voltage includes, for example, a lithium-manganese composite oxide ($Li_xMn_2O_4$), a lithium-nickel composite oxide ($Li_xNiO_2$), a lithium-cobalt composite oxide ($Li_xCoO_2$), a lithium-nickel-cobalt composite oxide ($Li_xNi_{1-y}Co_yO_2$), a spinel type lithium-manganese-nickel composite oxide ($Li_xMn_{2-y}Ni_yO_4$), a lithium-manganese-cobalt composite oxide ($li_xMn_yCo_{1-y}O_2$), a lithium phosphorus oxide ($Li_xFePO_4$), and a lithium-nickel-cobalt-manganese composite oxide. Incidentally, it is desirable for each of the molar ratios x and y to fall within a range of 0<x≦1, 0<y≦1.

It is desirable for the lithium-nickel-cobalt-manganese composite oxide to have a composition of $Li_aNi_bCo_cMn_dO_2$ (where the molar ratios a, b, c and d are: 0≦a≦1.1, 0.1≦b≦0.5, 0≦c≦0.9, 0.1≦d≦0.5).

Particularly, in the case of using a nonaqueous electrolyte containing an ionic liquid, it is desirable in view of the charge-discharge cycle life of the battery to use the positive electrode active material selected from the group consisting of the lithium iron phosphate, $Li_xVPO_4F$, a lithium-manganese composite oxide, a lithium-nickel composite oxide, and a lithium-nickel-cobalt composite oxide. Since the reactivity between the positive electrode active material exemplified above and the ionic liquid is low, it is possible to obtain a long charge-discharge cycle life of the battery as pointed out above.

Also, the positive electrode active material for the primary battery includes, for example, manganese dioxide, iron oxide, copper oxide, iron sulfide and a fluorocarbon.

It is desirable for the diameters of the primary particles of the positive electrode active material to fall within a range of 100 nm to 1 μm. If the diameter of the primary particle is not smaller than 100 nm, the primary particles can be handled easily in the industrial manufacture of the positive electrode. Also, if the primary particles of the positive electrode active material is not larger than 1 μm, the lithium ions can be diffused smoothly within the positive electrode active material.

It is desirable for the specific surface area of the positive electrode active material to fall within a range of 0.1 m$^2$/g to 10 m$^2$/g. If the specific surface area of the positive electrode active material is not smaller than 0.1 m$^2$/g, it is possible to secure sufficiently the absorption-release sites of the lithium ions. On the other hand, if the specific surface area of the positive electrode active material is not larger than 10 m$^2$/g, the positive electrode active material can be handled easily in the industrial manufacture of the positive electrode. Also, it is possible to secure a good charge-discharge cycle performance of the battery.

The positive electrode conductive agent permits enhancing the current collecting performance and also permits suppressing the contact resistance between the current collector and the active material. The positive electrode conductive agent includes, for example, a carbonaceous material such as acetylene black, carbon black and graphite.

The binder for bonding the positive electrode active material to the positive electrode conductive agent includes, for example, polytetrafluoroethylene (PTFE), polyvinylidene fluoride (PVdF) and a fluorinated rubber.

Concerning the mixing ratio of the positive electrode active material, the positive electrode conductive agent, and the binder, it is desirable for the mixing amount of the positive electrode active material to be not smaller than 80% by weight and not larger than 95% by weight, for the mixing amount of the positive electrode conductive agent to be not smaller than 3% by weight and not larger than 18% by weight, and for the mixing amount of the binder to be not smaller than 2% by weight and not larger than 17% by weight. If the positive electrode conductive agent is mixed in an amount not smaller than 3% by weight, it is possible to obtain the effects described above. On the other hand, if the mixing amount of the positive electrode conductive agent is not larger than 18% by weight, it is possible to suppress the decomposition of the nonaqueous electrolyte on the surface of the positive electrode conductive agent during storage of the nonaqueous electrolyte battery under high temperatures. Further, where the binder is used in an amount not smaller than 2% by weight, it is possible to obtain a sufficient electrode strength. On the other hand, where the mixing amount of the binder is not larger than 17% by weight, it is possible to decrease the mixing amount of the insulator in the electrode so as to decrease the internal resistance of the nonaqueous electrolyte battery.

The positive electrode can be prepared by, for example, suspending the positive electrode active material, the conductive agent and the binder in an appropriate solvent, followed by coating a current collector with the resultant suspension and subsequently drying and pressing the current collector coated with the suspension. It is also possible to form a mixture of a positive electrode active material, a positive electrode conductive agent and a binder into the shape of pellets. In this case, the pellets thus formed is used for forming the positive electrode layer.

It is desirable for the positive electrode current collector to be formed of an aluminum foil or an aluminum alloy foil. It is desirable for the aluminum foil or the aluminum alloy foil forming the positive electrode current collector to have an average crystal grain size not larger than 50 μm. It is more desirable for the average crystal grain size noted above to be not larger than 30 μm, and furthermore desirably not larger than 5 μm. Where the average crystal grain size of the aluminum foil or the aluminum alloy foil forming the positive electrode current collector is not larger than 50 μm, the mechanical strength of the aluminum foil or the aluminum alloy foil can be drastically increased so as to make it possible to press the positive electrode with a high pressure. It follows that the density of the positive electrode can be increased so as to increase the battery capacity.

The aluminum foil or the aluminum alloy foil having the average crystal grain size not larger than 50 μm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

4) Separator

The separator includes, for example, a porous film including polyethylene, polypropylene, cellulose and/or polyvinylidene fluoride (PVdF), and an unwoven fabric made of a synthetic resin. Particularly, it is desirable in view of the improvement in safety to use a porous film made of polyethylene or polypropylene because the particular porous film can be melted under a prescribed temperature so as to break the current.

5) Case

The case is formed of a laminate film having a thickness of, for example, 0.2 mm or less, or a metal sheet having a thickness of, for example, 0.5 mm or less. It is more desirable for the metal sheet to have a thickness of 0.2 mm or less. Also, the case has a flattened shape, an angular shape, a cylindrical shape, a coin shape, a button shape or a sheet shape, or is of a laminate type. The case includes a case of a large battery mounted to, for example, an electric automobile having two to four wheels in addition to a small battery mounted to a portable electronic device.

The laminate film includes, for example, a multi-layered film including a metal layer and a resin layer covering the metal layer. For decreasing the weight of the battery, it is desirable for the metal layer to be formed of an aluminum foil or an aluminum alloy foil. On the other hand, the resin layer for reinforcing the metal layer is formed of a polymer material such as polypropylene (PP), polyethylene (PE), Nylon, and polyethylene terephthalate (PET). The laminate film case can be obtained by bonding the periphery of superposed laminate films by the thermal fusion.

It is desirable for the metal case to be formed of aluminum or an aluminum alloy. Also, it is desirable for the aluminum alloy to be an alloy containing an element such as magnesium, zinc or silicon. On the other hand, it is desirable for the amount of the transition metals, which are contained in the aluminum alloy, such as iron, copper, nickel and chromium, to be not larger than 1%. In this case, it is possible to improve the battery in respect of reliability for a long time in a high-temperature environment, and heat dissipating properties.

It is desirable for the metal can formed of aluminum or an aluminum alloy to have an average crystal grain size not larger than 50 μm, more preferably not larger than 30 μm, and furthermore preferably not larger than 5 μm. Where the average crystal grain size is not larger than 50 μm, it is possible to increase drastically the mechanical strength of the metal can formed of aluminum or an aluminum alloy so as to make it possible to decrease the thickness of the metal can used as the case. As a result, it is possible to realize a battery that is light in weight, high in output, excellent in reliability over a long period, and adapted for mounting on a vehicle.

6) Negative Electrode Terminal

The negative electrode terminal is formed of a material exhibiting an electrical stability and conductivity within the range of 0.4V to 3V of the potential relative to the lithium metal. To be more specific, the material used for forming the negative electrode terminal includes, for example, aluminum and an aluminum alloy containing at least one element selected from the group consisting of Mg, Ti, Zn, Mn, Fe, Cu and Si. In order to lower the contact resistance relative to the negative electrode current collector, it is desirable for the negative electrode terminal to be formed of a material equal to the material used for forming the negative electrode current collector.

7) Positive Electrode Terminal

The positive electrode terminal is formed of a material exhibiting an electrical stability and conductivity within the range of 3V to 5V of the potential relative to the lithium ion metal. To be more specific, the material used for forming the positive electrode terminal includes, for example, aluminum and an aluminum alloy containing at least one element selected from the group consisting of Mg, Ti, Zn, Mn, Fe, Cu and Si. In order to lower the contact resistance relative to the positive electrode current collector, it is desirable for the positive electrode terminal to be formed of a material equal to the material used for forming the positive electrode current collector.

Figure 3:
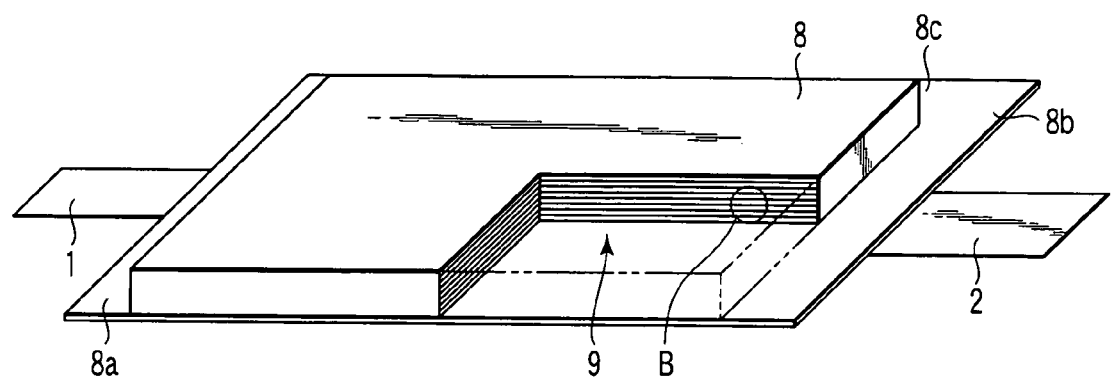
FIG. 3 is an oblique view, partly broken away, schematically showing the construction of another nonaqueous electrolyte battery according to the first embodiment of the present invention.
Figure 4:
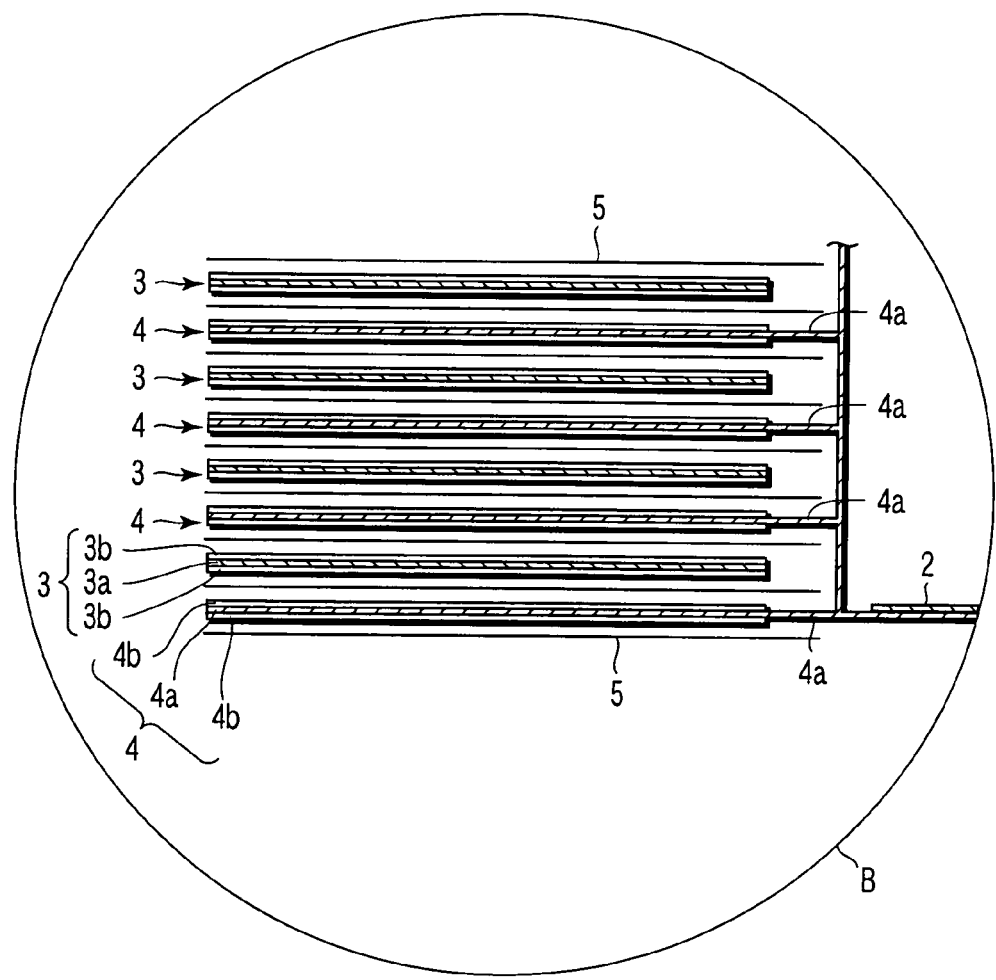
FIG. 4 is a cross sectional view showing in a magnified fashion the construction of region B of the nonaqueous electrolyte battery shown in FIG. 3.

The construction of the nonaqueous electrolyte battery according to the first embodiment of the present invention is not limited to that shown in FIGS. 1 and 2. It is possible for the nonaqueous electrolyte battery according to the first embodiment of the present invention to be constructed as shown in FIGS. 3 and 4. Specifically, FIG. 3 is a cross sectional view, partly broken away, schematically showing the construction of another flat type nonaqueous electrolyte battery according to the first embodiment of the present invention, and FIG. 4 is a cross sectional view showing in a magnified fashion the construction of the circular region B shown in FIG. 3.

As shown in FIG. 3, a laminate type electrode group 9 is housed in a case 8 made of a laminate film. Two short sides and one long side of the case 8 are sealed by the heat seal. The sealed section formed in one of the short sides is called a first sealed section 8a. The sealed section formed in the short side opposite to the first sealed section 8a is called a second sealed section 8b. Further, the sealed section formed on the long side is called a third sealed section 8c. As shown in FIG. 4, the laminate type electrode group 9 is constructed such that a positive electrode 3 and a negative electrode 4 are laminated one upon the other with a separator 5 interposed between the positive electrode 3 and the negative electrode 4. A plurality of positive electrodes 3 are housed in the case 8. Each of these positive electrodes 3 comprises a positive electrode current collector 3a and positive electrode active material-containing layers 3b supported on both surfaces of the positive electrode current collector 3a. Likewise, a plurality of negative electrodes 4 are housed in the case 8. Each of these negative electrodes 4 comprises a negative electrode current collector 4a and negative electrode active material-containing layers 4b formed on both surfaces of the negative electrode current collector 4a. The negative electrode current collector 4a included in each negative electrode 4 protrudes at one side from the positive electrode 3. The negative electrode current collector 4a protruding from the positive electrode 3 is electrically connected to a band-like negative electrode terminal 2. The tip portion of the band-like negative electrode terminal 2 is withdrawn to the outside from the second sealed section 8b of the case 8. The positive electrode current collector 3a of the positive electrode 3 protrudes from the negative electrode 4 at the side positioned opposite to the protruding side of the negative electrode current collector 4a, though the protruding side of the positive electrode current collector 3a is not shown in the drawing. The positive electrode current collector 3a protruding from the negative electrode 4 is electrically connected to a band-like positive electrode terminal 1. The tip portion of the band-like positive electrode terminal 1 is positioned on the opposite side of the negative electrode terminal 2 and is withdrawn to the outside from the first sealed section 8a of the case 8.

Second Embodiment

A battery pack according to a second embodiment of the present invention comprises a plurality of unit cells each consisting of the nonaqueous electrolyte battery according to the first embodiment of the present invention. The plural unit cells are connected to each other in series or in parallel to form a battery module.

The unit cell (nonaqueous electrolyte battery) according to the first embodiment of the present invention is adapted for preparation of the battery module, and the battery pack according to the second embodiment of the present invention is excellent in the charge-discharge cycle characteristics, as described in the following.

It should be noted that, if the impregnation capability of the negative electrode with the nonaqueous electrolyte is improved, it is possible to bring the surface of the negative electrode active material into contact with the nonaqueous electrolyte to make the negative electrodes equal to each other in the utilization rate. As a result, it is possible to diminish the differences in capacity and in the impedance among the individual unit cells. It follows that in the battery module in which the unit cells are connected in series, it is possible to diminish the unevenness of the battery voltage when the unit cells are fully charged. The unevenness of the battery voltage is derived from the difference in the battery capacity among the individual unit cells. Such being the situation, the battery pack according to the second embodiment of the present invention is excellent in the controllability of the battery module voltage to make it possible to expect the improvement in the charge-discharge cycle characteristics.

It is possible to use the flat type battery shown in FIG. 1 or FIG. 3 as the unit cell included in the battery module.

Figure 5:
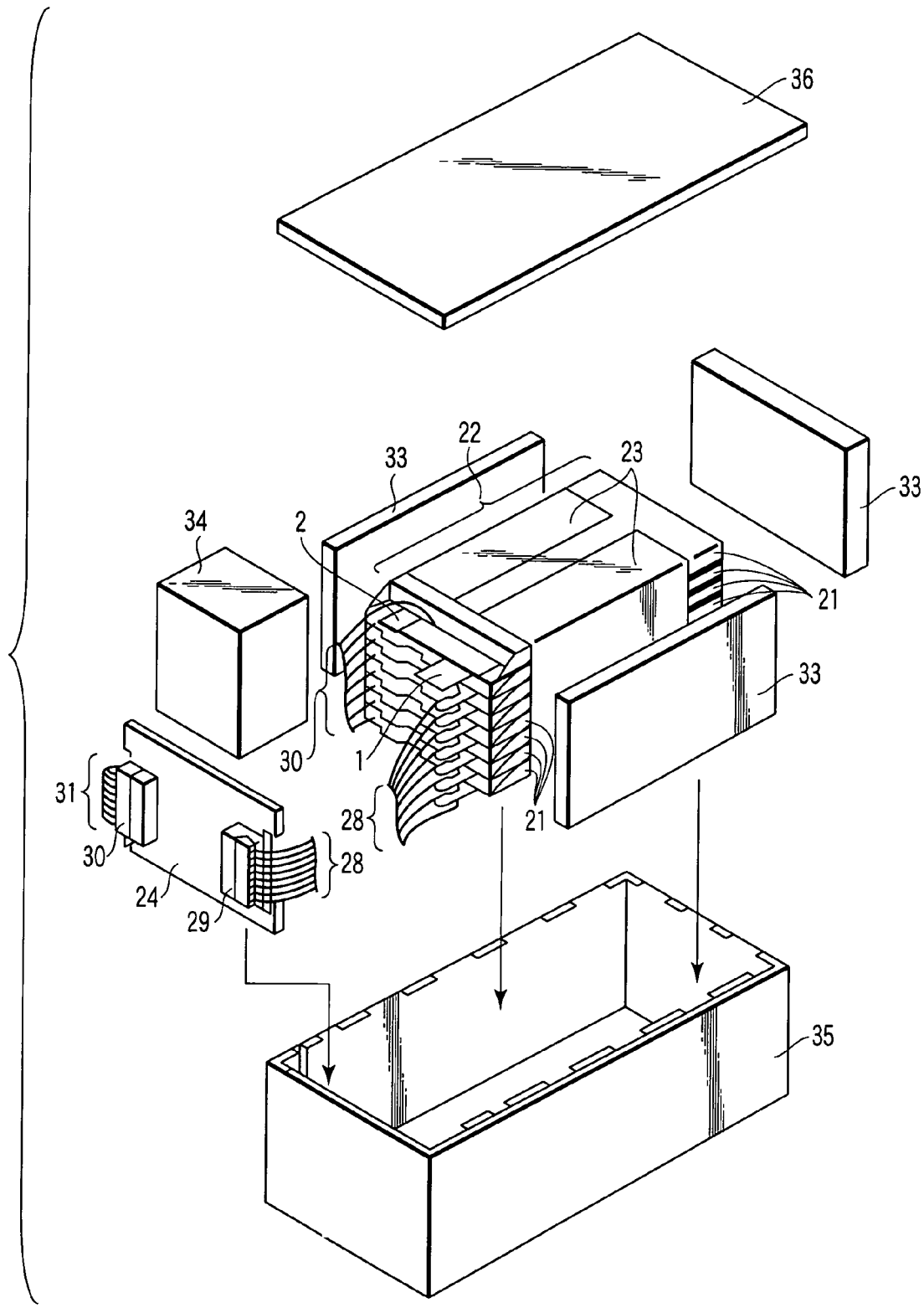
FIG. 5 is an oblique view showing in a dismantled fashion the construction of the battery pack according to a second embodiment of the present invention.

Each of a plurality of unit cells 21 included in the battery pack shown in FIG. 5 is formed of a flattened type nonaqueous electrolyte battery constructed as shown in FIG. 1. The plural unit cells 21 are stacked one upon the other in the thickness direction in a manner to align the protruding directions of the positive electrode terminals and the negative electrode terminals. As shown in FIG. 6, the unit cells 21 are connected in series so as to form a battery module 22. The unit cells 21 forming the battery module 22 are made integral by using an adhesive tape 23 as shown in FIG. 5.

A printed wiring board 24 is arranged on the side surface of the battery module 22 toward which protrude the positive electrode terminals 1 and the negative electrode terminals 2. As shown in FIG. 6, a thermistor 25, a protective circuit 26 and a terminal 27 for current supply to the external equipment are connected to the printed wiring board 24.

As shown in FIGS. 5 and 6, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

In the case of FIG. 6, a wiring 32 is connected to each of the unit cells 21 for detecting the voltage, and the detection signal is transmitted through these wirings 32 to the protective circuit 26. Specifically, the protective circuit 26 is provided with a battery voltage monitoring circuit section. Each of the unit cells 21 is connected to the battery voltage monitoring circuit section via a wiring 32. According to the particular construction, the battery voltage of each of the unit cells 21 can be detected by the protective circuit 26.

Further, in the case shown in FIG. 6, all the unit cells 21 included in the battery module 22 are detected in terms of voltage. Although it is particularly preferable that the voltages of all of the unit cells 21 of the battery module 22 should be detected, it may be sufficient to check the voltages of only some of the unit cells 21.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk so as to fix the battery module 22.

The unit cells 21 shown in FIGS. 5 and 6 are connected in series. However, it is also possible to connect the unit cells 21 in parallel so as to increase the cell capacity. Of course, it is possible to connect the battery packs in series and in parallel.

Also, the construction of the battery pack can be changed appropriately depending on the use of the battery pack.

It is desirable for the battery pack according to the second embodiment of the present invention to be used in the field requiring good large current characteristics and long charge-discharge cycle characteristics. To be more specific, it is desirable for the battery pack according to the second embodiment of the present invention to be used in, for example, a digital camera as a power supply, or mounted in a vehicle such as a hybrid electric automobile having two to four wheels, an electric automobile having two to four wheels, and or a power-assisted bicycle. Particularly, it is desirable for the battery back of the present invention to be mounted to a vehicle.

Where the nonaqueous electrolyte contains a mixed solvent containing at least two kinds of the compounds selected from the group consisting of propylene carbonate (PC), ethylene carbonate (EC) and γ-butyrolactone (GBL), or where the solvent of the nonaqueous electrolyte contains γ-butyrolactone (GBL), it is desirable for the battery pack of the second embodiment to be used in a field requiring good high temperature characteristics, particularly, to be used in the types of vehicle noted above.

Described in the following are Examples of the present invention. Needless to say, the technical scope of the present invention is not limited to the following Examples, as far as the subject matter of the present invention is not exceeded.

Example 1

<Preparation of Positive Electrode>

A slurry was prepared by adding 90% by weight of a powder of lithium-nickel-cobalt-manganese composite oxide ($LiNi_{1/3}Co_{1/3}Mn_{1/3}O_2$) used as a positive electrode active material, 5% by weight of acetylene black used as a conductive agent, and 5% by weight of polyvinylidene fluoride (PVdF) used as a binder to N-methylpyrrolidone (NMP) while stirring the mixture. Then, both surfaces of a current collector formed of an aluminum foil having a thickness of 15 μm were coated with the resultant slurry, followed by drying and, then, pressing the aluminum foil coated with the slurry to obtain a positive electrode having an electrode density of 3.3 $g/cm^3$.

<Preparation of Negative Electrode>

A lithium titanate powder having a spinel structure and represented by $Li_4Ti_5O_{12}$ was obtained by the baking at 780° C. for 10 hours. The lithium titanate powder was pulverized within ethanol for 3 hours by a ball mill using zirconia balls each having a diameter of 3 mm as a pulverizing medium. The pulverized powder was baked again at 500° C. for one hour to synthesize lithium titanate porous particles having a spinel structure, a specific volume of pores of 0.0106 mL/g, an average pore size of 78.2 Å, and an average particle diameter of 0.89 μm.

The measuring methods of the particle diameter of the negative electrode active material will now be described.

<Particle Diameter>

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, so as to analyze the particle diameter distribution data.

Figure 8:
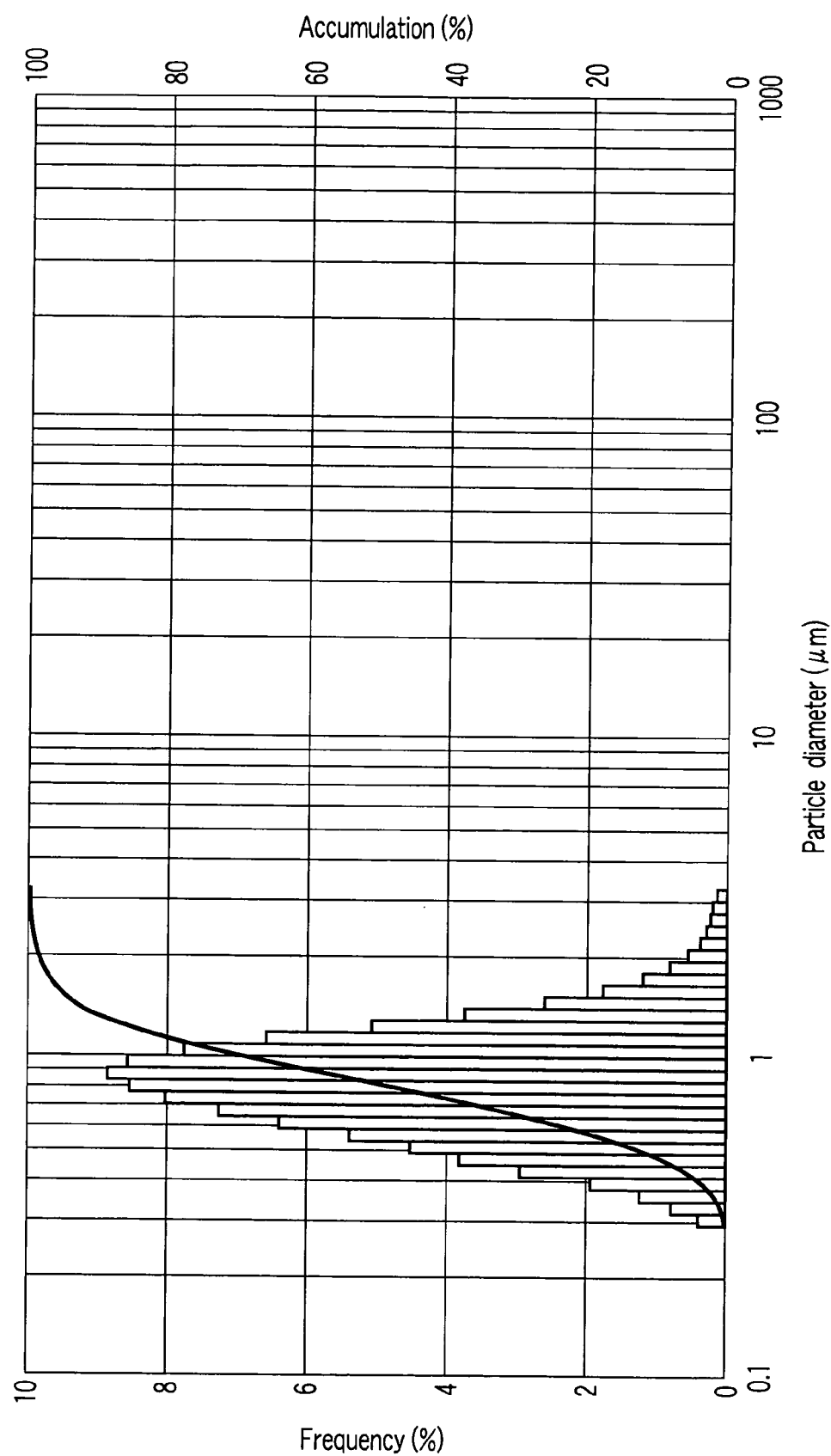
FIG. 8 is a graph showing the particle diameter distribution, as determined by the laser diffraction, of the negative electrode active material for Example 1.

FIG. 8 is a graph showing the particle diameter distribution. In the graph of FIG. 8, the particle diameter (μm) of the lithium titanate porous particles is plotted on the abscissa, the volume frequency (%) of the particles having the particle diameters falling within a prescribed range is plotted on the ordinate on the left side, and the volume sum frequency (%) obtained by accumulating the volumes of the particles starting with the particles having the small diameter is plotted on the ordinate on the right side of the graph. The particle diameter at the time when the volume sum frequency was 50% was used as the average particle diameter.

The pore volume and the average pore size were measured as follows.

Specifically, the pore size distribution of the negative electrode active material was measured by the gas adsorption method explained in the following. Shimadzu Micromelitex ASAP-2010 for using the nitrogen gas adsorption and measuring both of the pore size distribution and the specific surface area was used as the measuring apparatus. A negative electrode active material in an amount of about 1 g was taken in a measuring cell as a sample, and the sample was subjected to a degassing treatment by drying under a reduced pressure at 200° C. for about 15 hours in a pretreatment section of the apparatus for subjecting the sample to the measurement. The conditions for the degassing treatment were adapted for the sample having micro pores having a pore size not larger than 10 Å. To be more specific, the He gas exhausting time after the free space measurement was set at 3 hours.

The BJH analytical method was employed for the analysis of the meso-pore region having a pore size of 10 to 3,000 Å excluding 10 Å, and the Horvath-Kawazoe analytical method was employed for the analysis of the micro pore region having a pore size not larger than 10 Å. Table 2 shows the experimental data relating to the pore volume in respect of the pore size falling within a range of 10 to 3,000 Å excluding 10 Å, the pore size not larger than 10 Å, and over the entire range of the pore size.

In the nitrogen gas adsorption method, the pore size distribution is obtained from the isothermal desorption curve of the nitrogen gas under the temperature of the liquid nitrogen. In this analytical method, the pore size distribution is obtained by analyzing the isothermal desorption curve on the assumption that, under a prescribed relative pressure, a layer of multiple molecules having a thickness t is adsorbed on the cylindrical pore having a radius larger than a radius Rp and that a capillary condensation is brought about in the cylindrical pore having a radius smaller than the radius Rp noted above. The relationship among the relative pressure, the radius Rp and the thickness t is given by the Kelvin equation (1) given below:

$$Rp-t=-(2\sigma V\cos\theta)/RT\ln(P/P_0) \quad (1)$$

where Rp denotes the radius of the pore, t denotes the thickness of the adsorption layer of multiple molecules, $\sigma$ denotes the surface tension of the liquid, V denotes the molar volume of the liquid, $\theta$ denotes the contact angle of the liquid, R denotes the gas constant, T denotes the absolute temperature, P denotes the inner pressure of the sample cell, and $P_0$ denotes the saturated vapor pressure.

The methods of measuring the pore size distribution based on the idea given above include, for example, the BJH (Barrett-Joyner-Halenda) method, the CI (Cranston-Inkley) method, and the DH (Dollimore-Hel) method. However, the capillary condensation theory can be applied to only the pores having a pore size of 1 to 2 nm. The pores sized smaller than the value given above are analyzed by the MP method or the HK (Horvath-Kawazoe) method based on the isothermal adsorption curve. In the Examples described herein, the BJH analytical method was employed for the analysis of the meso-pore region having the pore size falling within a range of 10 Å to 3,000 Å (excluding 10 Å), and the HK analytical method was employed for the analysis of the micro pore region having the pore size not larger than 10 Å.

Concerning the details of the measuring method, the principle thereof, etc., attention should be paid of ("Biryushi Handbook (Fine Particle Handbook)" by Motoji Jimbo, et al., published by Asakura Shoten (1991)) and "Huntaibussei Sokuteihou (Method of Measuring Properties of Powdery Material)" compiled by Souhatiro Hayakawa, and published by Asakura Shoten (1978)).

The average pore size was measured by the method described in the following, and the result of the measurement is also shown in Table 2.

Specifically, the average pore size was obtained by an equation of 4V/A. The 4V is a value which is four times as large as the total pore volume (V) obtained by the BJH analysis. The A is the BET specific surface area.

If the pore is assumed to be a cylindrical pore having a diameter D and a length L, the volume V of the pore is: $V=\pi D^2 L/4$. Since the side area A is: $A=\pi DL$, the diameter D is: $D=4V/A$.

The measuring apparatus equal to that used for calculating the pore size distribution, i.e., Shimadzu Micromelitix ASAP-2010, was used for measuring the BET specific surface area of the negative electrode active material. A $N_2$ gas was used as the adsorption gas, and the sample weight was 1 g. Tables 2 and 4 show the results of the measurements.

The pH value of the negative electrode active material was measured by the method described previously. Table 1 shows the pH values thus measured.

A slurry was prepared by adding N-methyl pyrrolidone (NMP) to a mixture consisting of 90% by weight of the lithium titanate porous particles having the spinel structure and represented by $Li_4Ti_5O_{12}$, 5% by weight of a coke baked at 900° C. and used as a conductive agent and having a layer spacing $d_{002}$ of 0.3465 nm, an average particle diameter of 8.2 μm, and a BET specific surface area of 11.2 m²/g and 5% by weight of polyvinylidene fluoride (PVdF). Then, both surfaces of the current collector formed of an aluminum foil having a thickness of 15 μm, a purity of 99.99%, and an average crystal grain size of 10 μm were coated with the slurry thus obtained, followed by drying and, then, pressing the current collector coated with the slurry to obtain a negative electrode having an electrode density of 2.0 g/cm³.

<Preparation of Electrode Group>

A positive electrode, a separator formed of a porous polyethylene film having a thickness of 25 μm, a negative electrode, and another separator were laminated one upon the other in the order mentioned, followed by spirally winding the resultant laminate structure. Then, the spirally wound laminate structure was thermally pressed at 90° C. to obtain a flat electrode group having a width of 30 mm, and a thickness of 3.0 mm. The electrode group thus obtained was housed in a pack formed of a laminate film having a thickness of 0.1 mm and consisting of an aluminum foil having a thickness of 40 μm and polypropylene layers formed on both surfaces of the aluminum foil, followed by subjecting the electrode group housed in the pack to the vacuum drying at 80° C. for 24 hours.

<Preparation of Liquid Nonaqueous Electrolyte>

A liquid nonaqueous electrolyte was prepared by dissolving $LiBF_4$ used as an electrolyte in a mixed solvent prepared by mixing ethylene carbonate (EC) and γ-butyrolactone at a mixing ratio by volume of 1:2. The electrolyte was dissolved in the mixed solvent in an amount of 1.5 mol/L. The viscosity of the liquid nonaqueous electrolyte thus prepared was found to be 7.1 cp at 20° C. as measured by the B-type viscometer.

The liquid nonaqueous electrolyte was poured into the laminate film pack housing the electrode group, followed by completely sealing the pack by the heat seal to manufacture a nonaqueous electrolyte secondary battery having a width of 35 mm, a thickness of 3.2 mm and a height of 65 mm.

Examples 2 to 7 and Comparative Examples 1 to 3

A lithium titanate porous particles was synthesized and the nonaqueous electrolyte secondary battery was manufactured as in Example 1, except that the pulverizing time in the ball mill in the stage of synthesizing the lithium titanate used as the negative electrode active material was changed as shown in Table 1. Tables 1 and 2 show the pH value, the specific surface area, the pore volume and the average pore size of the negative electrode active material.

Example 8

A $Li_2Ti_3O_7$ powder having a ramsdellite structure was synthesized by the baking at 1,100° C. for 10 hours. The $Li_2Ti_3O_7$ powder was pulverized for 12 hours in ethanol by using a ball mill including as the pulverizing medium zirconia balls each having a diameter of 3 mm, followed by re-baking the pulverized powder at 500° C., and thereby obtaining $Li_2Ti_3O_7$ porous particles having a ramsdellite structure. The $Li_2Ti_3O_7$ porous particles had an average particle diameter of 0.88 μm, and also had the pH value, the specific surface area, the pore volume and the average pore size, which are shown in Tables 1 and 2.

Examples 9, 10 and Comparative Example 4

A lithium titanate porous particles was synthesized and the nonaqueous electrolyte secondary battery was manufactured as in Example 8, except that the pulverizing time in the ball mill in the stage of synthesizing the lithium titanate used as the negative electrode active material was changed as shown in Table 1. Tables 1 and 2 show the pH value, the specific surface area, the pore volume and the average pore size of the negative electrode active material.

Comparative Example 5

A nonaqueous electrolyte secondary battery was manufactured as in Example 1, except that the graphite powder having the specific surface area, the pore volume and the average pore size as shown in Table 2 was used as the negative electrode active material.

Example 11

A liquid nonaqueous electrolyte was prepared by dissolving 1 mol/L of $LiPF_6$ used as an electrolyte in a mixed solvent prepared by mixing ethylene carbonate (EC) and diethyl carbonate (DEC) in a volume ratio of 1:2. The viscosity of the liquid nonaqueous electrolyte was found to be 1.9 cp at 20° C. Then, a nonaqueous electrolyte secondary battery was manufactured as in Example 4, except that used was the nonaqueous electrolyte thus prepared.

Examples 12 to 21

A lithium titanate porous particles was synthesized and the nonaqueous electrolyte secondary battery was manufactured as in Example 1, except that the pulverizing time in the ball mill in the stage of synthesizing the lithium titanate used as the negative electrode active material was changed as shown in Table 3. Tables 3 and 4 show the pH value, the specific surface area, the pore volume and the average pore size of the negative electrode active material.

The secondary battery for each of the Examples and the Comparative Examples excluding Comparative Example 5 was charged for one hour under a constant voltage of 2.8V under an environment of 25° C., followed by discharging the secondary battery at a low discharge rate of 0.2 A to measure the discharge capacity at 0.2 A. Also, after the charging under the same conditions as above, the secondary battery was discharged at a high rate of 3 A to measure the discharge capacity at 3 A. Then, the ratio of the discharge capacity at 3 A to the discharge capacity at 0.2 A was calculated. Also, the charge-discharge cycle test was conducted by repeating the cycle that, after charged under the conditions given above, the secondary battery was discharged under a constant current of 600 mA until the battery voltage was lowered to 1.5V. The number of the charge-discharge cycles that were repeated before the battery capacity was lowered to 80% of the initial capacity was evaluated as the cycle life of the secondary battery. Tables 2 and 4 show the results of the measurements.

Also, the secondary battery for Comparative Example 5 was charged for one hour under a constant voltage of 4.2V under an environment of 25° C., followed by discharging the secondary battery under a low current of 0.2 A to measure the discharge capacity at 0.2 A. Also, after being charged under the same conditions, the secondary battery was discharged under a high current of 3 A to measure the discharge capacity at 3 A. Then, the ratio of the discharge capacity at 3 A to the discharge capacity at 0.2 A was calculated. Further, the charge-discharge cycle test was conducted by repeating the cycle in which, after being charged under the conditions given above, the secondary battery was discharged under a constant current of 600 mA until the battery voltage was lowered to 1.5V. The number of the charge-discharge cycles that were repeated before the battery capacity was lowered to 80% of the initial capacity was evaluated as the cycle life of the secondary battery. Table 2 shows the results of the measurements.

TABLE 1

| | Positive electrode active material | Nonaqueous electrolyte | Negative electrode active material | Negative electrode active material pH | Pulverizing time in ball mill | Re-baking conditions |
|---|---|---|---|---|---|---|
| Comparative Example 1 | $LiNi_{1/3}Co_{1/3}Mn_{1/3}O_2$ | 1.5M $LiBF_4$-EC/GBL(1:2) | $Li_4Ti_5O_{12}$ | 11.4 | — | — |
| Comparative Example 2 | $LiNi_{1/3}Co_{1/3}Mn_{1/3}O_2$ | 1.5M $LiBF_4$-EC/GBL(1:2) | $Li_4Ti_5O_{12}$ | 11.8 | 1 hour | — |
| Comparative Example 3 | $LiNi_{1/3}Co_{1/3}Mn_{1/3}O_2$ | 1.5M $LiBF_4$-EC/GBL(1:2) | $Li_4Ti_5O_{12}$ | 10.3 | 1 hour | 500° C. 1 hour |
| Example 1 | $LiNi_{1/3}Co_{1/3}Mn_{1/3}O_2$ | 1.5M $LiBF_4$-EC/GBL(1:2) | $Li_4Ti_5O_{12}$ | 10.4 | 3 hours | 500° C. 1 hour |

TABLE 1-continued

|  | Positive electrode active material | Nonaqueous electrolyte | Negative electrode active material | Negative electrode active material pH | Pulverizing time in ball mill | Re-baking conditions |
|---|---|---|---|---|---|---|
| Example 2 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.5 | 6 hours | 500° C. 1 hour |
| Example 3 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.6 | 12 hours | 500° C. 1 hour |
| Example 4 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.6 | 24 hour | 500° C. 1 hour |
| Example 5 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.8 | 48 hours | 500° C. 1 hour |
| Example 6 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.8 | 72 hours | 500° C. 1 hour |
| Example 7 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.8 | 68 hours | 500° C. 1 hour |
| Comparative Example 4 | LiNi$_{1/3}$Co$_{1/3}$Mn$_{1/3}$O$_2$ | 1.5M LiBF$_4$ - EC/GBL(1:2) | Li$_2$Ti$_3$O$_7$ | 11.3 | — | — 1 hour |
| Example 8 | LiNi$_{1/3}$Co$_{1/3}$Mn$_{1/3}$O$_2$ | 1.5M LiBF$_4$ - EC/GBL(1:2) | Li$_2$Ti$_3$O$_7$ | 10.4 | 12 hours | 500° C. 1 hour |
| Example 9 | LiNi$_{1/3}$Co$_{1/3}$Mn$_{1/3}$O$_2$ | 1.5M LiBF$_4$ - EC/GBL(1:2) | Li$_2$Ti$_3$O$_7$ | 10.5 | 24 hours | 500° C. 1 hour |
| Example 10 | LiNi$_{1/3}$Co$_{1/3}$Mn$_{1/3}$O$_2$ | 1.5M LiBF$_4$ - EC/GBL(1:2) | Li$_2$Ti$_3$O$_7$ | 10.7 | 48 hours | 500° C. 1 hour |
| Comparative Example 5 | LiNi$_{1/3}$Co$_{1/3}$Mn$_{1/3}$O$_2$ | 1.5M LiBF$_4$ - EC/GBL(1:2) | Carbonaceous material | — | — | — |

TABLE 2

|  | BET Specific surface area (m$^2$/g) | Pore volume (mL/g) Range of 10 to 3,000 Å | Pore volume (mL/g) Not larger than 10 Å | Pore volume (mL/g) Total pore volume | Average pore size (Å) | 0.3 A discharge capacity (mAh) | Capacity retention ratio during discharge at 3 A (%) | Cycle life (cycles) |
|---|---|---|---|---|---|---|---|---|
| Comparative Example 1 | 1.87 | 0.0041 | — | 0.0041 | 772.7 | 580 | 34 | 300 |
| Comparative Example 2 | 2.21 | 0.0067 | 0.0003 | 0.0070 | 39.4 | 585 | 48 | 450 |
| Comparative Example 3 | 2.04 | 0.0066 | 0.0003 | 0.0069 | 39.4 | 585 | 48 | 450 |
| Example 1 | 5.19 | 0.0096 | 0.0010 | 0.0106 | 78.2 | 590 | 76 | 600 |
| Example 2 | 9.49 | 0.0213 | 0.0013 | 0.0226 | 95.4 | 595 | 82 | 650 |
| Example 3 | 26.71 | 0.0966 | 0.0019 | 0.0985 | 147.5 | 600 | 86 | 680 |
| Example 4 | 35.48 | 0.1492 | 0.0031 | 0.1523 | 177.7 | 600 | 87 | 700 |
| Example 5 | 45.90 | 0.2145 | 0.0043 | 0.2188 | 190.7 | 600 | 88 | 700 |
| Example 6 | 52.91 | 0.4576 | 0.0062 | 0.4638 | 216.4 | 600 | 88 | 720 |
| Example 7 | 71.92 | 0.7293 | 0.0094 | 0.7387 | 264.3 | 600 | 88 | 700 |
| Comparative Example 4 | 0.77 | 0.0018 | — | 0.0018 | 768.3 | 560 | 28 | 250 |
| Example 8 | 20.11 | 0.0066 | 0.0011 | 0.0077 | 81.4 | 590 | 70 | 400 |
| Example 9 | 28.72 | 0.0101 | 0.0016 | 0.0117 | 133.8 | 595 | 76 | 430 |
| Example 10 | 39.34 | 0.0163 | 0.0038 | 0.0201 | 174.2 | 600 | 80 | 450 |
| Comparative Example 5 | 10.71 | 0.0226 | 0.0010 | 0.0236 | 78.4 | 590 | 40 | 15 |

TABLE 3

|  | Positive electrode active material | Nonaqueous electrolyte | Negative electrode active material | Negative electrode active material pH | Pulverizing time in ball mill | Re-baking conditions |
|---|---|---|---|---|---|---|
| Example 11 | LiNi$_{1/3}$Co$_{1/3}$Mn$_{1/3}$O$_2$ | 1M LiPF$_6$ - EC/DEC(1:2) | Li$_4$Ti$_5$O$_{12}$ | 10.6 | 24 hours | 500° C. 1 hour |
| Example 12 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.4 | 2 hours | 500° C. 1 hour |
| Example 13 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.5 | 8 hours | 500° C. 1 hour |

TABLE 3-continued

| | Positive electrode active material | Nonaqueous electrolyte | Negative electrode active material | Negative electrode active material pH | Pulverizing time in ball mill | Re-baking conditions |
|---|---|---|---|---|---|---|
| Example 14 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 11.0 | 216 hours | 500° C. 1 hour |
| Example 15 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.8 | 100 hours | 500° C. 1 hour |
| Example 16 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.6 | 18 hours | 500° C. 1 hour |
| Example 17 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.9 | 144 hours | 500° C. 1 hour |
| Example 18 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.0 | 6 hours | 600° C. 1 hour |
| Example 19 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 10.3 | 6 hours | 500° C. 3 hour |
| Example 20 | LiNi$_{1/3}$Co$_{1/3}$Mn$_{1/3}$O$_2$ | 1.5M LiBF$_4$ - EC/GBL(1:2) | Li$_4$Ti$_5$O$_{12}$ | 11.0 | 6 hours | 400° C. 1 hour |
| Example 21 | LiNi$_{1/3}$Co$_{1/3}$Mn$_{1/3}$O$_2$ | 1.5M LiBF$_4$ - EC/GBL(1:2) | Li$_2$Ti$_3$O$_7$ | 11.2 | 48 hours | 400° C. 1 hour |

TABLE 4

| | BET Specific surface area (m$^2$/g) | Pore volume (mL/g) | | | Average pore size (Å) | 0.3 A discharge capacity (mAh) | Capacity retention ratio during discharge at 3 A (%) | Cycle life (cycles) |
|---|---|---|---|---|---|---|---|---|
| | | Range of 10 to 3,000 Å | Not larger than 10 Å | Total pore volume | | | | |
| Example 11 | 35.48 | 0.1492 | 0.0031 | 0.1523 | 177.7 | 600 | 85 | 700 |
| Example 12 | 4.08 | 0.0084 | 0.0008 | 0.0092 | 50 | 590 | 74 | 590 |
| Example 13 | 10.92 | 0.0298 | 0.0014 | 0.0312 | 100 | 595 | 82 | 650 |
| Example 14 | 96.51 | 1.3115 | 0.0135 | 1.325 | 500 | 600 | 87 | 560 |
| Example 15 | 76.52 | 0.8063 | 0.01 | 0.8173 | 312.1 | 600 | 88 | 640 |
| Example 16 | 27.86 | 0.0980 | 0.0020 | 0.1 | 151.4 | 600 | 86 | 680 |
| Example 17 | 84.76 | 0.9889 | 0.0111 | 1 | 412.6 | 600 | 87 | 600 |
| Example 18 | 9.32 | 0.0205 | 0.0010 | 0.0215 | 93.8 | 595 | 81 | 650 |
| Example 19 | 9.46 | 0.0210 | 0.0012 | 0.0222 | 94.2 | 595 | 82 | 650 |
| Example 20 | 9.51 | 0.0218 | 0.0015 | 0.0233 | 95.6 | 595 | 81 | 650 |
| Example 21 | 40.01 | 0.0164 | 0.0040 | 0.0204 | 174.4 | 600 | 78 | 450 |

The experimental data given in Tables 1 to 4 support that the negative electrode active material for each of Examples 1 to 21, which contained lithium-titanium composite oxide porous particles having an average pore size of 50 to 500 Å, was high in the high rate discharge characteristics, i.e., not lower than 70%, and long in the cycle life, i.e., not shorter than 400 cycles.

If the negative electrode active material is synthesized without applying pulverization as in Comparative Examples 1 and 4, the average pore size of the negative electrode active material is increased to exceed 500 Å. Since fine pores are scarcely formed in the negative electrode active material for each of Comparative Examples 1 and 4, the average pore size reflects the size of the macro pores on the surface of the negative electrode active material. It is considered reasonable to understand that such a macro pore is low in its function of increasing the impregnation capability of the negative electrode with the liquid nonaqueous electrolyte to lower both the high rate discharge characteristics and the charge-discharge cycle performance.

The pulverization was applied in the process of synthesizing the negative electrode active material in Comparative Example 2. However, if the pulverizing time is short as in Comparative Example 2, the amount of micro pores formed is small, with the result that the average pore size was smaller than 50 Å. As a result, the wettability of the liquid nonaqueous electrolyte with the negative electrode active material was lowered and, thus, the high rate discharge characteristics for Comparative Example 2 was made lower than those for Examples 1 to 21. The negative electrode active material for Comparative Example 3 was synthesized by applying a re-baking process after the pulverizing process under the conditions equal to those for Comparative Example 2. The pH value of the negative electrode active material was certainly lowered by the application of the re-baking process. However, since the average pore size was not changed, the battery characteristics for Comparative Example 3 were substantially equal to those for Comparative Example 2.

In Comparative Example 5, a carbonaceous material was used as the negative electrode active material. In the case of using the carbonaceous material as the negative electrode active material, the charge-discharge cycle characteristics were found to be inferior to those for Examples 1 to 21 even if the average pore size was increased to exceed 50 Å.

The relationship between the pore size distribution in the negative electrode active material and the battery characteristics will now be described more in detail.

Concerning the average pore size, it can be understood by the comparison among Examples 1 to 7 that the negative electrode active material for Examples 3 to 7 having an average pore size of 100 to 500 Å is superior to the negative electrode active material for Examples 1 and 2 having an average pore size smaller than 100 Å in each of the high rate discharge characteristics and the charge-discharge cycle characteristics. Also, a similar tendency can be obtained even if the composition of the lithium titanate is changed, as apparent from Examples 8 to 10.

Concerning the pore volume, the negative electrode active material for Example 2 having a specific pore volume of not less than 0.02 mL/g is superior to the negative electrode active material for Example 1 having a specific pore volume of not less than 0.01 mL/g in each of the high rate discharge characteristic and the charge-discharge cycle characteristic. In the negative electrode active material for Examples 4 to 7 in which the specific pore volume is not smaller than 0.1 mL/g, it was possible to obtain a particularly prominent charge-discharge cycle characteristic, which was not smaller than 700 cycles. The experimental data clearly support that, in order to improve the large current characteristic and the charge-discharge cycle characteristic, it is desirable for the specific pore volume to be not smaller than 0.02 mL/g, more desirably not smaller than 0.1 mL/g.

When it comes to the composition of the negative electrode active material, it can be understood that the negative electrode active material for Examples 1 to 7, which was formed of the spinel type lithium titanate, was superior to the negative electrode active material for Examples 8 to 10, which was formed of the ramsdellite type lithium titanate, in the charge-discharge cycle characteristic.

Figure 7:
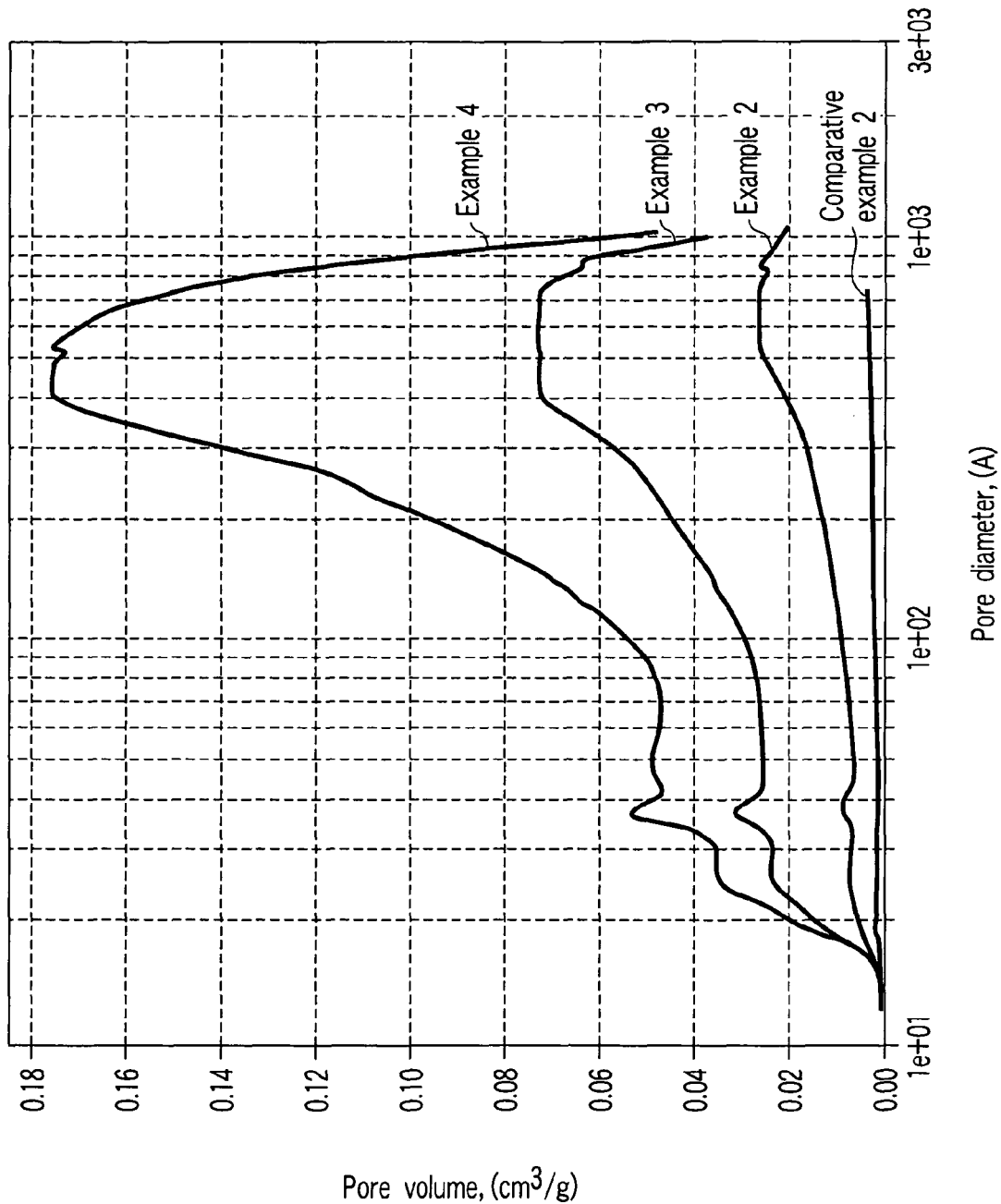
FIG. 7 is a graph showing the log differential pore volume distribution of the negative electrode active material measured by the gas adsorption method (BHJ analytical result (desorption side))

FIG. 7 is a graph showing the distribution of the log differential pore volume (BHJ analytical result (desorption type)). As pointed out previously, the average pore size can be obtained by the equation of 4V/A. The 4V is a value which is four times as large as the total pore volume (V) obtained from FIG. 7. The A is the BET specific surface area. The four curves given in FIG. 7 correspond to the negative electrode active materials for Example 4, Example 3, Example 2 and Comparative Example 2, as viewed from the upper portion of the graph. The graph of FIG. 7 clearly support that the pore volume is increased in the order of Example 4>Example 3>Example 2>Comparative Example 2 in the order mentioned. Also, the negative electrode active materials for these Examples and Comparative Example were in the order mentioned in terms of the average pore size, which was obtained from the experimental data given in FIG. 7 and the result of the measurement of the BET specific surface area.

The agglomerated state of the negative electrode active material for each of Examples 1 to 21, i.e., the judgment as to whether the negative electrode active material particles were in the form of primary particles or secondary particles, was confirmed by the method described in the following.

Whether the negative electrode active material is formed of primary particles or secondary particles can be judge easily by the observation of the active material with a scanning type electron microscope (SEM) or a transmission type electron microscope (TEM). Further, the judgment can be performed without fail by comparing the microscopic observation and measuring a particle diameter distribution by a laser diffraction. It should be noted that where the negative electrode active material forms secondary particles, the primary particle diameter confirmed by the microscopic observation is not reflected in the particle diameter distribution, and the secondary particle diameter confirmed by the microscopic observation is reflected in the particle diameter distribution.

Figure 9:
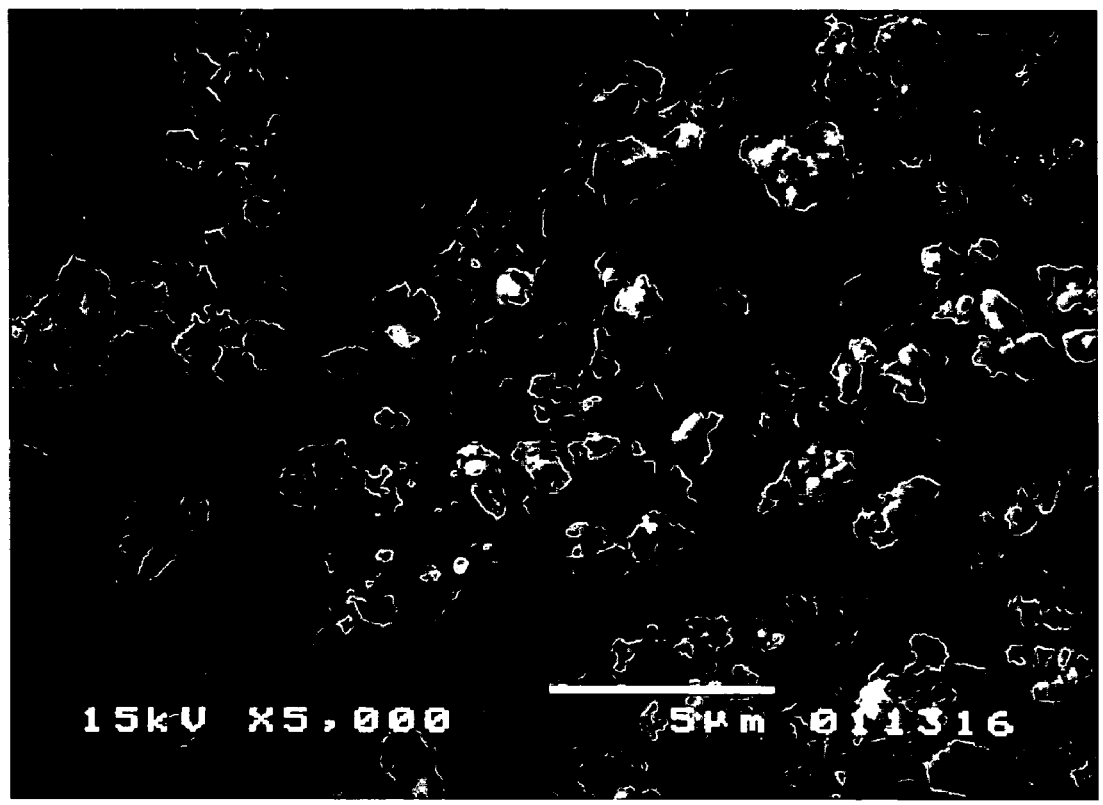
FIG. 9 is a photo by a scanning electron microscope (SEM) showing the lithium titanate having the spinel structure for Example 2.

FIG. 9 is a photo of the scanning type electron microscope (SEM) showing the spinel type lithium titanate used in Example 2. The average particle diameter obtained by the particle diameter distribution by the laser diffraction referred to previously was 0.8 µm, which conforms well with the particle diameter that can be confirmed by the photo. It follows that it is reasonable to judge that the spinel type lithium titanate shown in FIG. 9 is formed of primary particles.

Figure 10:
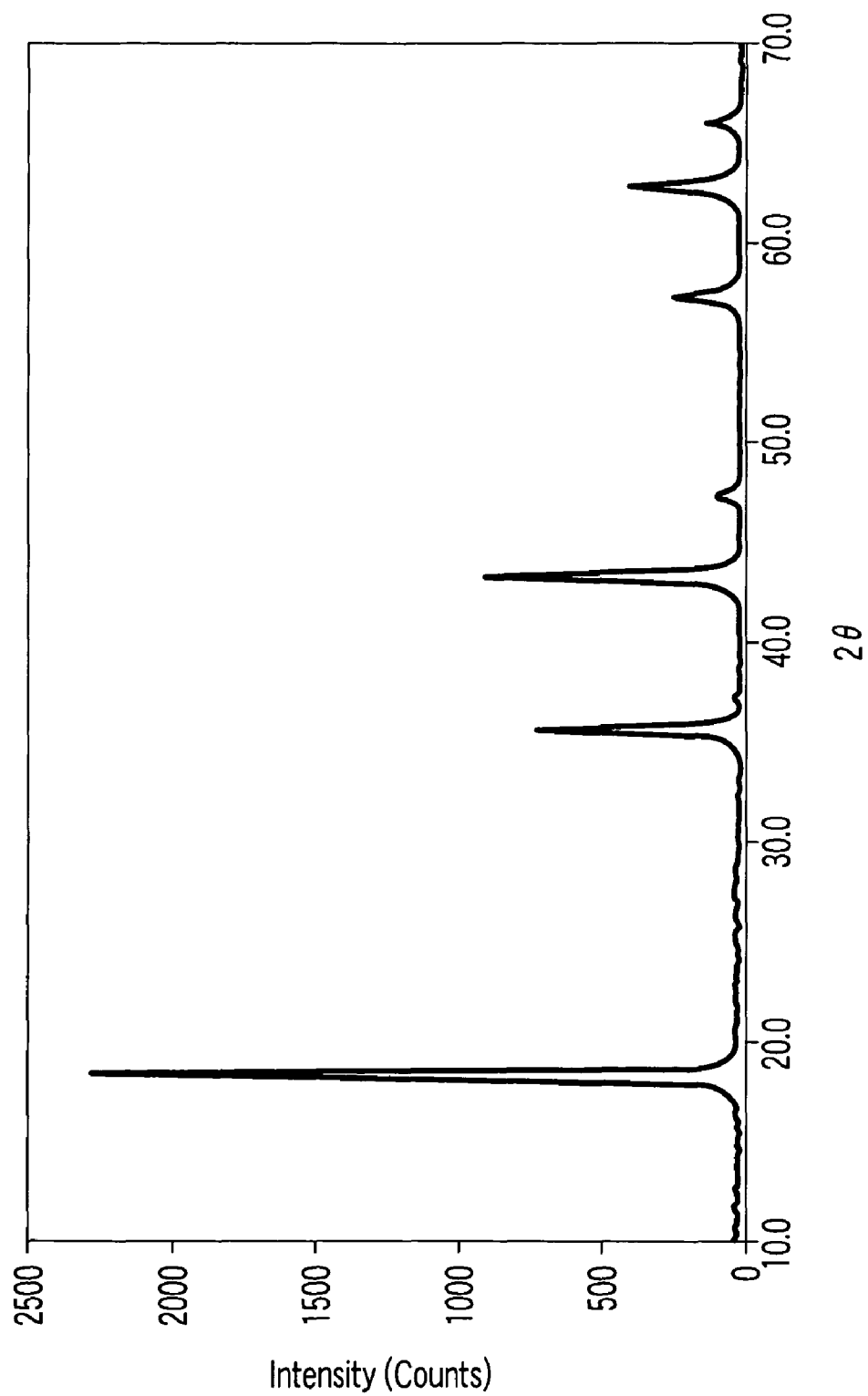
FIG. 10 shows the X-ray diffraction pattern of the lithium titanate having the spinel structure for Example 2.

As pointed out above, it was possible to judge that the negative electrode active material for each of Examples 1 to 21 was formed of primary particles. It is considered reasonable to understand that it was possible to improve the large current characteristics and the charge-discharge cycle characteristics of nonaqueous electrolyte secondary battery for each of Examples 1 to 21 because the primary particles has the pore size distribution as described in Tables 2 and 4 in each of these Examples. FIG. 10 shows the X-ray diffraction pattern of the spinel type lithium titanate used in Example 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery, comprising:
a positive electrode;
a negative electrode comprising lithium-titanium composite oxide porous particles having an average pore size of 50 to 500 Å, a specific pore volume of 0.01 to 1 mL/g and a pH value of 10 to 11.2, wherein the pH value is measured by dispersing 2 grams of the lithium-titanium composite oxide porous particles in 100 mL of a pure water at 25° C. to obtain a suspension, stirring the suspension for approximately 10 minutes, filtering the lithium-titanium composite oxide porous particles to obtain a filtrate, and measuring the pH value of the filtrate; and
a nonaqueous electrolyte.

2. The nonaqueous electrolyte battery according to claim 1, wherein the average pore size is 100 to 500 Å.

3. The nonaqueous electrolyte battery according to claim 1, wherein the pores of the lithium-titanium composite oxide porous particles have micro-pores having a size not larger than 10 Å and a specific volume of not smaller than 0.001 mL/g.

4. The nonaqueous electrolyte battery according to claim 3, wherein the specific volume of the micro-pores is 0.001 to 0.01 mL/g.

5. The nonaqueous electrolyte battery according to claim 1, wherein the lithium-titanium composite oxide porous particles comprise a lithium titanate phase having a spinel structure.

6. The nonaqueous electrolyte battery according to claim 1, wherein the lithium-titanium composite oxide porous particles have an average particle diameter not larger than 1 µm.

7. The nonaqueous electrolyte battery according to claim 1, wherein the nonaqueous electrolyte comprises at least two solvents selected from the group consisting of propylene carbonate, ethylene carbonate and γ-butyrolactone.

8. The nonaqueous electrolyte battery according to claim 1, wherein the nonaqueous electrolyte comprises $LiBF_4$.

9. The nonaqueous electrolyte battery according to claim 1, wherein the nonaqueous electrolyte has a viscosity not lower than 5 cp at 20° C.

10. The nonaqueous electrolyte battery according to claim 1, wherein the positive electrode contains a compound represented by $Li_aNi_bCo_cMn_dO_2$, where $0 \leq a \leq 1.1$, $0.1 \leq b \leq 0.5$, $0 \leq c \leq 0.9$ and $0.1 \leq d \leq 0.5$.

11. The nonaqueous electrolyte battery according to claim 1, wherein the negative electrode comprises a negative electrode current collector formed of an aluminum foil or an aluminum alloy foil.

12. The nonaqueous electrolyte battery according to claim 11, wherein each of the aluminum foil and the aluminum alloy foil has an average crystal grain size not larger than 50 µm.

13. A battery pack, comprising nonaqueous electrolyte batteries, each nonaqueous electrolyte battery comprising:
   a positive electrode;
   a negative electrode comprising lithium-titanium composite oxide porous particles having an average pore size of 50 to 500 Å, a specific pore volume of 0.01 to 1 mL/g and a pH value of 10 to 11.2, wherein the pH value is measured by dispersing 2 grams of the lithium-titanium composite oxide porous particles in 100 mL of a pure water at 25° C. to obtain a suspension, stirring the suspension for approximately 10 minutes, filtering the lithium-titanium composite oxide porous particles to obtain a filtrate, and measuring the pH value of the filtrate; and
   a nonaqueous electrolyte.

14. The battery pack according to claim 13, wherein at least one of the nonaqueous electrolyte batteries comprise:
   a case having a first sealed section formed at one edge portion, and a second sealed section formed at another edge portion positioned on the opposite side of said one edge portion;
   a positive electrode terminal including a tip portion withdrawn to an outside via the first sealed section of the case; and
   a negative electrode terminal including a tip portion withdrawn to the outside via the second sealed section of the case.

15. A vehicle comprising the battery pack defined in claim 13.

16. A negative electrode active material comprising lithium-titanium composite oxide porous particles having an average pore size of 50 to 500 Å, a specific pore volume of 0.01 to 1 mL/g and a pH value of 10 to 11.2, wherein the pH value is measured by dispersing 2 grams of the lithium-titanium composite oxide porous particles in 100 mL of a pure water at 25° C. to obtain a suspension, stirring the suspension for approximately 10 minutes, filtering the lithium-titanium composite oxide porous particles to obtain a filtrate, and measuring the pH value of the filtrate.

17. The negative electrode active material according to claim 16, wherein the pores of the lithium-titanium composite oxide porous particles have micro-pores having a size not larger than 10 Å and a specific volume of not smaller than 0.001 mL/g.

18. The nonaqueous electrolyte battery according to claim 1, wherein the lithium-titanium composite oxide porous particles have a BET specific surface area of from 5 to 50 $m^2/g$.

19. The battery pack according to claim 13, wherein the lithium-titanium composite oxide porous particles have a BET specific surface area of from 5 to 50 $m^2/g$.

20. The negative electrode active material according to claim 16, wherein the lithium-titanium composite oxide porous particles have a BET specific surface area of from 5 to 50 $m^2/g$.

* * * * *